(12) United States Patent
Saito

(10) Patent No.: US 11,842,479 B2
(45) Date of Patent: Dec. 12, 2023

(54) LAMINATED SHEET HAVING PRINTED LAYER AND MANUFACTURING THEREOF

(71) Applicant: 3M INNOVATIVE PROPERTIES COMPANY, St. Paul, MN (US)

(72) Inventor: Koji Saito, Yamagata (JP)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 353 days.

(21) Appl. No.: 17/279,226

(22) PCT Filed: Sep. 26, 2019

(86) PCT No.: PCT/IB2019/058200
§ 371 (c)(1),
(2) Date: Mar. 24, 2021

(87) PCT Pub. No.: WO2020/065592
PCT Pub. Date: Apr. 2, 2020

(65) Prior Publication Data
US 2021/0407063 A1    Dec. 30, 2021

(30) Foreign Application Priority Data
Sep. 27, 2018    (JP) .................................. 2018-181397

(51) Int. Cl.
*G06K 9/00*     (2022.01)
*G06T 7/00*     (2017.01)
*G01N 21/84*    (2006.01)

(52) U.S. Cl.
CPC ............. *G06T 7/001* (2013.01); *G01N 21/84* (2013.01); *G01N 2021/8472* (2013.01); *G06T 2207/30144* (2013.01)

(58) Field of Classification Search
CPC .......... G06T 7/001; G06T 2207/30144; G01N 21/84; G01N 2021/8472; B42D 15/0093; B41M 5/00; B44C 1/10
See application file for complete search history.

(56) References Cited

U.S. PATENT DOCUMENTS

2003/0011962 A1* 1/2003 Yamamoto ............... H01G 4/30
                                                       361/321.2
2003/0198772 A1* 10/2003 Weder ....................... B44C 1/10
                                                       428/40.1
(Continued)

FOREIGN PATENT DOCUMENTS

JP         4633710        2/2011
JP       2011-079332      4/2011
(Continued)

OTHER PUBLICATIONS

International Search Report for PCT International Application No. PCT/IB2019/058200, dated Jan. 3, 2020, 3 pages.

*Primary Examiner* — Samir A Ahmed

(57) ABSTRACT

A manufacturing method of a laminated sheet having a printed layer includes, given that a table that associates density data of a specific area included in image data with a burnup degree of the printed layer corresponding to the specific area at printing based on the image data is an image-burnup degree conversion table, identifying the image-burnup degree conversion table that satisfies a printing condition for the laminated sheet, acquiring printed image data that is image data for forming the printed layer of the laminated sheet, and calculating the burnup degree of the printed layer based on the image-burnup degree conversion table and the printed image data. Also disclosed is a laminated sheet having a printed layer, a system for manufacturing the laminated sheet, and a program for manufacturing the laminated sheet.

5 Claims, 12 Drawing Sheets

(56) References Cited

U.S. PATENT DOCUMENTS

| | | |
|---|---|---|
| 2007/0289705 A1 | 12/2007 | Nakagawa et al. |
| 2009/0266585 A1 | 10/2009 | Miyajima |
| 2015/0174938 A1 | 6/2015 | Yamaguchi et al. |
| 2018/0072921 A1 | 3/2018 | Kondo |
| 2018/0186132 A1 | 7/2018 | Ikeda |

FOREIGN PATENT DOCUMENTS

| | | |
|---|---|---|
| JP | 2014-172320 | 9/2014 |
| JP | 2016-135596 | 7/2016 |
| JP | 6027412 | 11/2016 |
| WO | WO 2008-129667 | 10/2008 |

* cited by examiner $A_C$

| 0 | 0 | 0 | 0 | 0 | 80 | 80 |
| 0 | 0 | 0 | 80 | 80 | 80 | 80 |
| 0 | 0 | 80 | 80 | 80 | 80 | 80 |
| 0 | 80 | 80 | 80 | 80 | 80 | 80 |
| 0 | 80 | 80 | 80 | 80 | 80 | 80 |
| 80 | 80 | 80 | 80 | 80 | 80 | 80 |
| 80 | 80 | 80 | 80 | 80 | 80 | 80 |

$A_M$

| 5 | 5 | 5 | 5 | 5 | 48 | 48 |
| 5 | 5 | 5 | 48 | 48 | 48 | 48 |
| 5 | 5 | 48 | 48 | 48 | 48 | 48 |
| 5 | 48 | 48 | 48 | 48 | 48 | 48 |
| 5 | 48 | 48 | 48 | 48 | 48 | 48 |
| 48 | 48 | 48 | 48 | 48 | 48 | 48 |
| 48 | 48 | 48 | 48 | 48 | 48 | 48 |

$A_Y$

| 8 | 8 | 8 | 8 | 8 | 24 | 24 |
| 8 | 8 | 8 | 24 | 24 | 24 | 24 |
| 8 | 8 | 24 | 24 | 24 | 24 | 24 |
| 8 | 24 | 24 | 24 | 24 | 24 | 24 |
| 8 | 24 | 24 | 24 | 24 | 24 | 24 |
| 24 | 24 | 24 | 24 | 24 | 24 | 24 |
| 24 | 24 | 24 | 24 | 24 | 24 | 24 |

$A_T$

| 50 | 52 | 54 | 55 | 58 | 59 | 60 |
| 52 | 54 | 56 | 58 | 59 | 60 | 60 |
| 54 | 56 | 58 | 60 | 60 | 61 | 61 |
| 55 | 58 | 60 | 60 | 61 | 62 | 62 |
| 58 | 60 | 60 | 61 | 62 | 64 | 64 |
| 59 | 60 | 61 | 62 | 64 | 66 | 67 |
| 60 | 60 | 61 | 62 | 64 | 67 | 68 |

FIG. 7

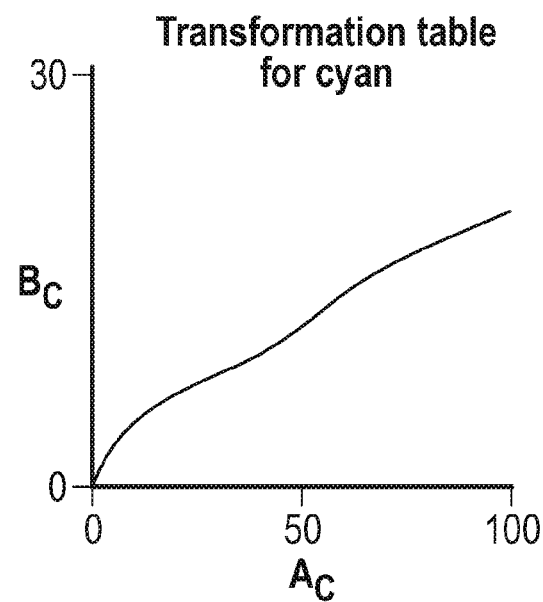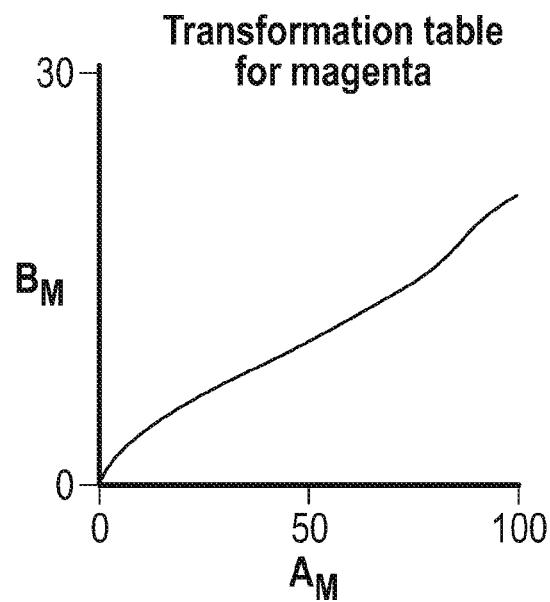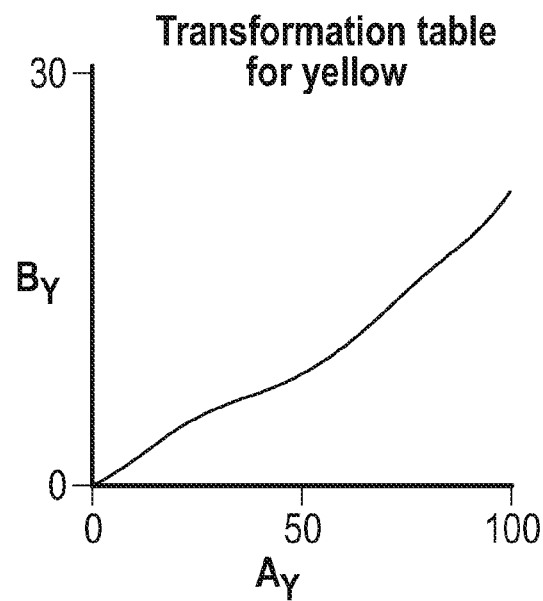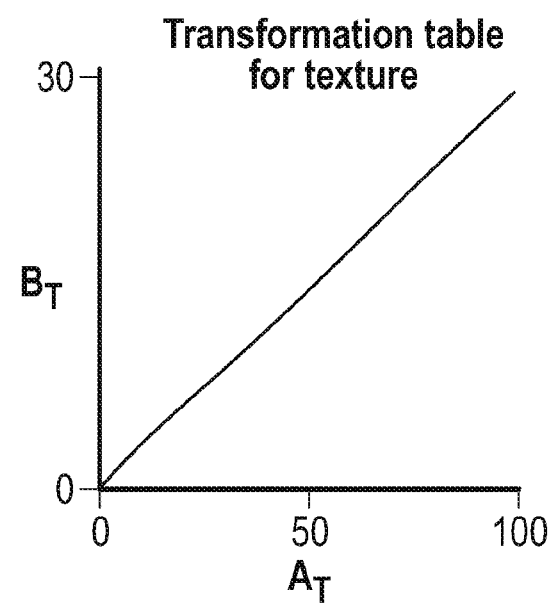
FIG. 8

$$B(x_1,y_1) = \sum_{Y=y_1}^{y_2} \sum_{X=x_1}^{x_2} \{B_C(A_C(x,y)) + B_M(A_M(x,y)) + B_Y(A_Y(x,y)) + B_T(A_T(x,y))\}$$

$B(x_1,y_1)$ : Total weight of paints in a sampling area starting from point $(x_1,y_1)$ $(x_1,y_1)$ : Start point of a sampling area (e.g. left-top point)

$(x_2,y_2)$ : End point of a sampling area (e.g. right-bottom point)

$A_C(x,y)$ : Concentration of cyan at point (x,y) in the print image data $A_M(x,y)$ : Concentration of magenta at point (x,y) in the print image data $A_Y(x,y)$ : Concentration of yellow at point (x,y) in the print image data $A_T(x,y)$ : Concentration of texture at point (x,y) in the print image data $B_C(A)$ : Weight of cyan paint at concentration A in the transform table $B_M(A)$ : Weight of magenta paint at concentration A in the transform table $B_Y(A)$ : Weight of yellow paint at concentration A in the transform table $B_T(A)$ : Weight of texture paint at concentration A in the transform table

FIG. 9

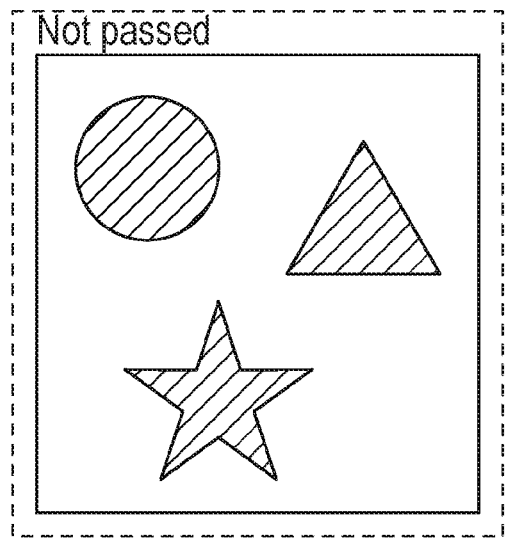
FIG. 10
FIG. 11
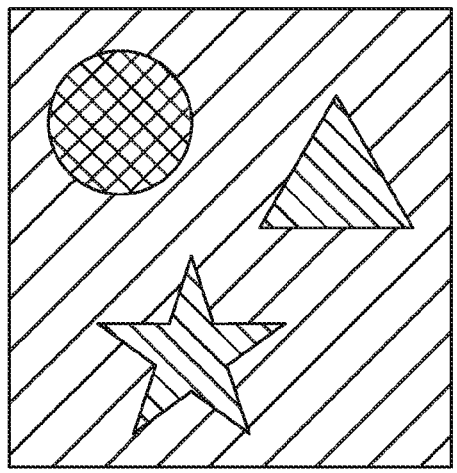
FIG. 12
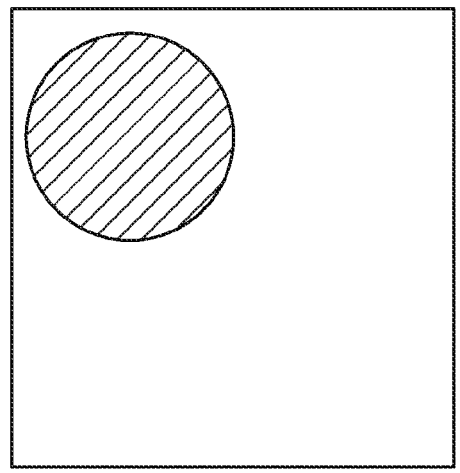
FIG. 13

$$C(x_1,y_1) = \max_{y_1 \leq y \leq y_2} \max_{x_1 \leq x \leq x_2} \{C_C(A_C(x,y)) + C_M(A_M(x,y)) + C_Y(A_Y(x,y)) + C_T(A_T(x,y))\}$$

$C(x_1,y_1)$ : Maximum height of paints in a sampling area starting from point $(x_1,y_1)$ $(x_1,y_1)$ : Start point of a sampling area (e.g. left-top point)

$(x_2,y_2)$ : End point of a sampling area (e.g. right-bottom point)

$A_C(x,y)$ : Concentration of cyan at point (x,y) in the print image data $A_M(x,y)$ : Concentration of magenta at point (x,y) in the print image data $A_Y(x,y)$ : Concentration of yellow at point (x,y) in the print image data $A_T(x,y)$ : Concentration of texture at point (x,y) in the print image data $C_C(A)$ : Height of cyan paint at concentration A in the transform table $C_M(A)$ : Height of magenta paint at concentration A in the transform table $C_Y(A)$ : Height of yellow paint at concentration A in the transform table $C_T(A)$ : Height of texture paint at concentration A in the transform table

FIG. 14

LAMINATED SHEET HAVING PRINTED LAYER AND MANUFACTURING THEREOF

BACKGROUND ART

Patent Document 1 (International Publication No. 2008/129667) describes "In a decorative sheet, a protective layer composed mainly of a transparent resin component is superimposed on the surface of a printed layer of a print sheet. The protective layer consists of a first protective layer superimposed on the printed layer of the print sheet and a second protective layer containing transparent or semi-transparent spherical particles and superimposed on given areas of the first protective layer. The luster of a salient surface of the first protective layer is lower than the luster of the surface of the second protective layer".

SUMMARY OF INVENTION

A manufacturing method of a laminated sheet having a printed layer according to an embodiment of the present disclosure includes, given that a table that associates density data of a specific area included in image data with a burnup degree of the printed layer corresponding to the specific area at printing based on the image data is an image-burnup degree conversion table, identifying the image-burnup degree conversion table that satisfies a printing condition for the laminated sheet by a processor, acquiring printed image data that is image data for forming the printed layer of the laminated sheet by the processor, calculating the burnup degree of the printed layer based on the image-burnup degree conversion table and the printed image data by the processor, determining whether the laminated sheet satisfies a burnup degree standard based on the calculated burnup degree by the processor, and if it is determined that the burnup degree standard is satisfied, forming the printed layer by a printer in accordance with the printing condition and the printed image data in response to a command of the processor.

Embodiments of the present disclosure include a system for manufacturing a laminated sheet having a printed layer, a program for manufacturing the laminated sheet, and a laminated sheet having a printed layer.

BRIEF DESCRIPTION OF DRAWINGS

FIG. 7 is a schematic view illustrating a density matrix of each ink and texture material corresponding to the enlarged image of FIG. 6C in the second embodiment.

FIG. 8 is a schematic view illustrating an image-burnup degree conversion table in the second embodiment.

FIG. 9 is an equation for finding a burnup degree of a sampling area in the second embodiment.

FIG. 10 is a conceptual view illustrating an example of printed image data with a determination result in the second embodiment.

FIG. 11 is a conceptual view illustrating an example of a burnup degree matrix obtained by enlarging a part of burnup degree image data in the second embodiment.

FIG. 12 is a conceptual view illustrating an example of burnup degree image data in the second embodiment.

FIG. 13 is a conceptual view illustrating an example of high burnup degree site image data in the second embodiment.

FIG. 14 is an equation for finding a burnup degree of a sampling area in a first modified example of the second embodiment.

DESCRIPTION OF EMBODIMENTS

Figure 1:
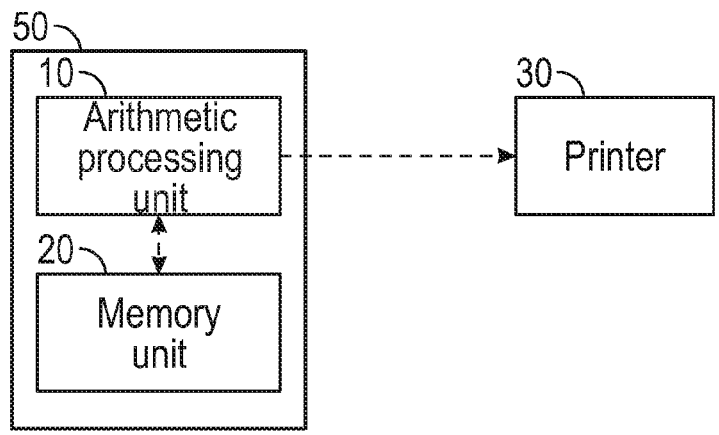
FIG. 1 is a block diagram illustrating an example of a schematic configuration of a laminated sheet manufacturing system according to a first embodiment.

The laminated sheet having a printed layer has been used, for example, as a decoration film for the interior and exterior of buildings, vehicles, and so on. In the technical field of the laminated sheet, diversification of printing patterns, shortening of lead time, and reduction of production lots has been recently required. In order to meet such requirements, the inventor has diligently studied a method for forming the printed layer of the laminated sheet using a digital printer. As a result, the following findings have been obtained.

For the decorative film, a burnup degree standard may be set by government authorities, organizations, and the like. Under the current situation where the number of printing patterns is not very large, a sample is prepared for each pattern, a predetermined combustion test or the like is performed, and a printing pattern satisfying the burnup degree standard is designed by trial and error. However, in order to produce various printing patterns with short lead time and small lots using the digital printer, it is desirable to design the printing patterns that satisfy the burnup degree standard in a more efficient manner. When a textured layer is formed using an inkjet printer, a laminated sheet having various uneven shapes on its surface can be easily formed by controlling the thickness of the textured layer. Especially in this case, the thickness of the textured layer increases, increasing the need to support the design of printing patterns that satisfy the burnup degree standard.

As a result of further investigations, the inventor has developed an unprecedented and revolutionary method. That is, there is a correlation between density data included in image data printed by the printer and the amount (deposited amount, applied amount, etc.) of a paint (ink and texture) applied to the laminated sheet. From the image data, the amount of paint contained in the finished laminated sheet can be determined by calculation based on the correlation. There is also a correlation between the amount of paint and the burnup degree. Therefore, based on the amount of paint obtained by calculation, it can be determined whether the finished laminated sheet satisfies a certain burnup degree standard, that is, whether the probability that the laminated sheet satisfies the burnup degree standard is high when the laminated sheet is actually created using the image data and a combustion test is performed.

According to such a method, the satisfiability of the burnup degree standard can be easily determined without making an actual sample and actually conducting the combustion test.

In addition, the number of samples required, the number of combustion tests, and the like can be reduced, thereby manufacturing a product that satisfies the burnup degree standard more efficiently.

Such a method is also highly compatible with the manufacturing of the laminated sheet using the inkjet printer. For example, even when the textured layer having various uneven shapes is formed using the inkjet printer, by adjusting the thickness of the printed layer including the textured layer, the printed layer having a desired uneven pattern can be designed and manufactured more efficiently while satisfying the burnup degree standard.

The above description is merely to explain the background of the present disclosure and does not limit the scope of the claims.

The "image data" refers to data including at least one of color information and texture information for forming the printed layer. The color information may be information for identifying the color (hue, saturation, and luminosity) distribution of the laminated sheet in plan view. Texture information may be information for identifying the thickness distribution of the laminated sheet in plan view. Color information and texture information may be included as density data. Information such as image size, resolution, preparer, license terms, etc. may also be included. The image data may be configured of a plurality of data files or may be configured of a single data file. For example, the image data may be configured of a data file (BMP file, JPEG file, etc.) that holds color information, and a data file (BMP file, GIF file, etc.) that holds texture information. The color information may be, for example, RGB information, CMY information, or CMYK information.

The "density data" may include, for the color information, information related to hue, saturation, and luminosity, and for the texture information, information related to the thickness of the textured layer. The density data may be identified for each unit area (e.g., pixel) included in an image. The color information and the texture information may have different resolutions. To perform calculation and determination on a specific area and a print area that overlap each other, the applied amount and burnup degree of pixels that overlap with the boundary between the areas may be corrected depending on the area of the pixels separated by the boundary.

The "density data of the specific area" refers to all density data included in the specific area. The density data of the specific area may include density data of all unit areas (e.g., pixels) included in the specific area. The specific area may be an area configured of a single pixel or an area configured of M×N pixels constituting a rectangular area. When image data is compressed, it may be density data of a compression unit. When an area configured of a plurality of pixels is used as the specific area, for example, an image-burnup degree conversion table can be configured by defining a value obtained by summing the density data values of the plurality of pixels as the density data of the specific area, and associating the density data and the burnup degree (e.g., the applied amount of paint) of the printed layer corresponding to the specific area.

The "printed layer" refers to a layer formed using a printer. The printed layer may include at least one of an ink layer and a textured layer. The printed layer may include both of the ink layer and the textured layer. The ink layer is a layer that brings about a color effect including shading. The textured layer is a layer that forms a surface configuration such as irregularities. However, the two layers are not necessarily exclusive, and the ink layer may contribute to the surface irregularities, or the textured layer may contribute to the color effect including shading. The ink layer can be formed based on the density data related to the color information in the image data. The textured layer may be formed based on the density data related to the texture information in the image data. The textured layer may be transparent, may be translucent, or may have a color. The printed layer may be configured of a plurality of different types of paint. The "printed layer corresponding to the specific area" refers to a portion of the printed layer, which visually corresponds to or matches the specific area included in the image data in plan view.

The "burnup degree" is a variable that indicates the degree of flammability. The burnup degree may be a variable that can be commonly evaluated for the impact of different types of paint on flammability. The burnup degree may be a variable that can be commonly evaluated for the effect of the printed layer and the base layer (the entire portion other than the printed layer in the laminated sheet) or additional layers (constituting the base layer: substrate sheet, adhesive layer, etc.) on flammability. Specifically, for example, the burnup degree may be the total applied amount per unit area of the paint constituting the printed layer, the total weight per unit area of the laminated sheet, the thickness of the printed layer or the laminated sheet, or the total weight, the total height, the heat release rate, or the total heat release amount of the paint or the flammable component (resin) per unit area contained in the laminated sheet. The burnup degree may be a value obtained by multiplying the weights of paint and sheet materials by respective coefficients (factors) for evaluating the flammability, and summing the values.

The burnup degree may be a single variable or a plurality of variables. In the case where the burnup degree is a combination of a plurality of variables, each variable may reflect the amount of all types of ink used (C, M, Y, K, etc.), or reflect the amount of all types of paints used (C, M, Y, K, texture, etc.). In the case where the effect of the ink layer on the burnup degree of the laminated sheet is ignorable, only the burnup degree of the textured layer may be calculated.

The "conversion table" refers to a rule for associating two or more variables with one another. The table may be, for example, a data table in a memory, or may be a function identifying a relationship between two or more variables.

The "image-burnup degree conversion table" is a conversion table that associates the density data of the specific area included in the image data with the burnup degree of the printed layer corresponding to the specific area at printing based on the image data. The association between the density data and the burnup degree may be empirically determined or deductively determined from printer design data. The association may be provided from the printer manufacturer.

The "laminated sheet" refers to a sheet including one or more layers, including at least a printed layer and a substrate sheet, and may further include an adhesive layer and other layers. Generally, a decorative sheet is also the laminated sheet. The laminated sheet can be used to decorate the interior and exterior of buildings, vehicles or the like. The laminated sheet can be a part of the layer, which remains on the applied surface when the sheet is applied. That is, when the sheet is peeled off from the release sheet and applied, the laminated sheet can be regarded as an article including no release sheet. Alternatively, when the burnup degree standard of the laminated sheet covers a member to which the sheet is applied (e.g., plaster board), the laminated sheet can be regarded as an article including the member.

The "printing condition for the laminated sheet" may be one other than the density data among information necessary for identifying the burnup degree of the printed layer formed using the printer based on the image data or the laminated sheet including the printed layer. Information on printing (resolution, size of printing area, number of times of overprinting, etc.), information on the printer (maker, type, model, model number, etc.), information on the paint (maker, model number, composition, components, amount of combustible components, the burnup degree per unit), information on the substrate sheet (maker, model number, composition, components, amount of combustible components, the burnup degree per unit, etc.), and information on the adhesive layer applied to or to be applied to the substrate sheet (maker, model number, composition, components, amount of combustible components, burnup degree per unit, etc.) may be included. The printing condition may be included in the printed image data, or may be provided separately from the printed image data.

A part of the printing condition may be included in the printed image data, and the rest may be provided separately from the printed image data. The variables included in the printing condition and the variables included in the image-burnup degree conversion table may overlap at least partially.

The "printed image data" refers to image data for forming a printed layer of the laminated sheet. The printed image data is typically a rectangle of 200 mm×200 mm or more, for example, about 1200 mm×1000 mm, and is larger than a sampling area, but is not limited thereto. The printed image data may be processed so as to make a seam inconspicuous in repeated printing. The resolution of the printed image data can be typically about 720 dpi.

"Calculating the burnup degree of the printed layer" refers not only to calculating the burnup degree of the printed layer alone but also calculating the total burnup degree of the printed layer and the base layer (the entire portion of the laminated sheet other than the printed layer) or the total burnup degree of the printed layer and additional layers. Even in such a case, the calculated burnup degree includes the burnup degree of the printed layer alone. The burnup degree of the printed layer includes at least the burnup degree of the printed layer alone.

The "burnup degree standard" refers to the standard about the degree of flammability defined for laminated sheets. Specifically, for example, the burnup degree standard can be set using a combination of reference values (upper limit value, lower limit value, average value, standard deviation, etc.) of one or more variables selected from the group consisting of the heat release rate, the total heat release, the combustion rate, the combustion time, and the combustion temperature. The variable defining the burnup degree standard (e.g., physical quantity) and the variable as the burnup degree calculated in the present disclosure (e.g., physical quantity) may or may not be the same. That is, by comparing the calculated burnup degree with a reference value of the burnup degree, it may be indirectly determined whether the burnup degree standard is satisfied.

The burnup degree standard may be a standard related to a single element (e.g., total heat release amount), or may be a standard related to multiple elements (e.g., total heat release amount and heat release rate). The number of variables calculated as the burnup degree and the number of elements defining the burnup degree standard may be the same or different.

The "paint" refers to a material that forms the printed layer. The paint may specifically include, for example, ink and textured materials. The paint may be a jetting liquid of an inkjet printer. The paint may be a paint containing a UV curable resin.

The "applied amount" refers to the amount of paint applied when the printer forms the printed layer. The applied amount may be an injected amount or a deposited amount, but is not necessarily a specific physical amount. The applied amount may specifically be, for example, the amount of paint contained in the printed layer formed on the substrate sheet. The applied amount may have a unique relation with the burnup degree of the printed layer, or may have a proportional relation with the burnup degree of the printed layer. The applied amount may be the total weight of the applied paints, may be the total volume of the applied paints, may be the total heat release amount of the applied paints, or may be the total height (thickness) of the paints. The applied amount may be the total weight of the flammable components (resins) contained in the paint, or the total volume of the flammable components contained in the paint, or the total heat release amount of the flammable components contained in the paint.

The "sampling area" may be a sampling area of the printed image data and the printed layer or the laminated sheet included in an area corresponding to the sampling area. The shape and size of the sampling area in the laminated sheet may correspond to the shape and size of the sample when the combustion test is performed based on the burnup degree standard of the laminated sheet. The sampling area is the same as or smaller than the printed image data. The sampling area may be defined in the unit of pixels, or may be defined in the unit of actual length (meters, centimeters, millimeters, etc.).

The "substrate sheet information" refers to information for identifying the burnup degree of the substrate sheet. The substrate sheet information may be the burnup degree of the substrate sheet, or may be an ID number uniquely associated with each type of substrate sheet (a group of substrate sheets having the same specification affecting the burnup degree). The burnup degree of the substrate sheet can be incorporated into calculation, determination, and the like using a table that associates the ID number with the burnup degree of the substrate sheet. The substrate sheet information may be base layer information or additional layer information.

Hereinafter, specific embodiments of the present disclosure will be illustrated with reference to attached drawings. In addition, description of following embodiment does not limit the present disclosure.

First Embodiment

FIG. 1 is a block diagram illustrating an example of a schematic configuration of a laminated sheet manufacturing system according to a first embodiment.

A laminated sheet manufacturing system 100 includes a printer 30 and a computer 50 including an arithmetic processing unit 10 and a storage unit 20.

The arithmetic processing unit 10 corresponds to a processor. The arithmetic processing unit 10 is exemplified by a CPU, an MPU, and the like. The arithmetic processing unit 10 may be configured as a single processing unit that performs centralized control, or may be configured as a plurality of processing units that perform distributed control in cooperation with each other.

The storage unit 20 is communicably connected to the arithmetic processing unit 10, and can store a control program read out and executed by the arithmetic processing unit 10, a printing condition for the laminated sheet, an image-burnup degree conversion table, printed image data, reference values of burnup degree, calculated burnup degree, determination results, and the like. Examples of the storage unit 20 include storage devices such as a main memory, a cache memory, a RAM, a ROM, a hard disk, an internal storage device, and an external storage device. The storage unit 20 may be commonly provided for various data to be stored, or storage devices may be separately provided for each data.

The printer 30 is communicably connected to the arithmetic processing unit 10, and forms a printed layer in accordance with the printing condition and the printed image data under the control of the arithmetic processing unit 10. The printer 30 is not particularly limited, but may be, for example, an inkjet printer, more specifically, an inkjet printer capable of performing printing using a UV curable ink. The inkjet printer can be equipped with a UV curing light source. The inkjet printer can be used as a general method of producing the laminated sheet by printing printed image data on the substrate sheet, and is well compatible with the present system.

One of the representative digital printing is inkjet printing. In inkjet printing, on-demand printing and printing of a small amount of various types are possible. Moreover, when using an ultraviolet curable ink, it is also possible to obtain a relatively thick printed layer and to form various printing patterns of a three-dimensional shape. The method for producing the laminated sheet of the present disclosure provides the laminated sheet that satisfies the burnup degree standard for each individual printing, even when printing a small amount and various types of printing or when forming a thick printing pattern that affects the flammability, which is extremely useful in inkjet printing.

Figure 2:
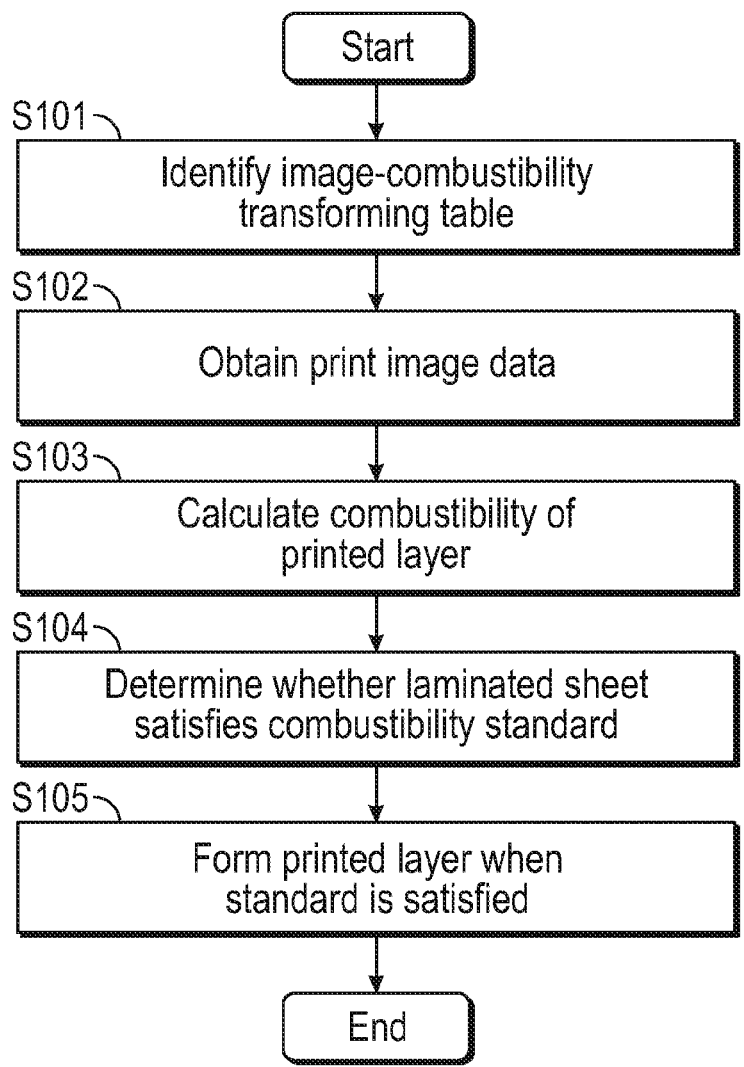
FIG. 2 is a flowchart illustrating an example of an outline of a laminated sheet manufacturing method according to the first embodiment.

FIG. 2 is a flowchart illustrating an example of an outline of a laminated sheet manufacturing method according to the first embodiment. The method is a method of operating the laminated sheet manufacturing system 100, and is realized by causing the arithmetic processing unit 10 of the computer 50 to execute a program stored in the storage unit 20.

When operation of the laminated sheet manufacturing system 100 is started (start), an image-burnup degree conversion table that satisfies the printing condition for the laminated sheet is identified (step S101). The printing condition may be acquired from outside of the system, for example, networks such as the Internet, intranets, wireless LAN, wired LAN (hereinafter referred to as "network"), and external recording media such as optical disks including CDs and DVDs, and a USB memory (hereinafter referred to as "recording media") by using a communication device, media reader or the like, or may be previously recorded in the storage unit 20, or a part thereof may be previously recorded in the storage unit 20 and the remaining part may be acquired from the outside of the system.

For example, when there is only one table, identifying may be to identify the place where the table is stored, to confirm whether the table satisfies the printing condition. When there are a plurality of tables, identifying may be to select a table that satisfies the printing condition. Identifying may include selecting, providing, preparing, and creating.

If the printing condition for the laminated sheet is predefined and there is only one image-burnup degree conversion table, the image-burnup degree conversion table recorded in the storage unit 20 may be identified. When the printing condition for the laminated sheet is given from the outside, one image-burnup degree conversion table that satisfies the printing condition may be selected from among a plurality of tables. The image-burnup degree conversion table may be acquired from the outside of the system, including the network and the recording medium, by the communication device, the media reader or the like, or may be previously recorded in the storage unit 20.

Next, printed image data, which is image data for forming the printed layer of the laminated sheet, is acquired (step S102). The printed image data may be acquired from the outside of the system, including the network and the recording medium, by the communication device, the media reading device or the like, or may be recorded in advance in the storage unit 20. When part or all of the printing condition is included in the printed image data, acquisition of the printed image data may be performed prior to the identification of the image-burnup degree conversion table.

Next, the burnup degree of the printed layer is calculated based on the image-burnup degree conversion table and the printed image data (step S103). The burnup degree of the printed layer includes at least the burnup degree of the printed layer alone. "Calculating the burnup degree of the printed layer" includes not only calculating the burnup degree of the printed layer alone but also calculating the total burnup degree of the printed layer and the base layer or the total burnup degree of the printed layer and additional layers. Even in such a case, the calculated burnup degree includes the burnup degree of the printed layer alone.

The calculation of the burnup degree may be further based on the printing condition for the laminated sheet. For example, when the number of times of overprinting is included as the printing condition, the number of times of overprinting may be multiplied by the burnup degree acquired based on the image-burnup degree conversion table and the printed image data. Alternatively, the number of times of overprinting may be reflected on the image-burnup degree conversion table. In this case, the image-burnup degree conversion table can be created such that the calculated burnup degree increases or decreases in accordance with the number of times of overprinting.

As described above, the printing condition may be reflected on the identification of the image-burnup degree conversion table, may be reflected on the calculation of the burnup degree, or may be reflected on both.

For example, the printing condition may include base layer information for identifying the burnup degree of the base layer. The base layer information may be the burnup degree of the base layer, or may be an ID number uniquely associated with the burnup degree of the base layer. The burnup degree of the substrate sheet can be incorporated into a table that associates the ID number with the burnup degree of the base layer.

The burnup degree of the base layer may be incorporated into the image-burnup degree conversion table. In this case, the burnup degree calculated using the table identified according to the printing condition is the sum of the burnup degree of the printed layer alone and the burnup degree of the base layer, which may be taken as the burnup degree of the printed layer. Alternatively, the burnup degree of the base layer may be added to the burnup degree of the printed layer alone calculated using the table, and this may be the burnup degree of the printed layer. The calculated burnup degree of the printed layer can be compared with the reference value of the burnup degree of the printed layer (the reference value of the total burnup degree of the printed layer and the additional layers). Alternatively, the burnup degree of the base layer may be subtracted from the reference value of the burnup degree of the laminated sheet to calculate the reference value of the burnup degree of the printed layer alone. In this case, the burnup degree of the printed layer alone calculated using the table can be compared with the reference value of the burnup degree of the printed layer alone.

The printing condition may include additional layer information for identifying the burnup degree of the additional layers (substrate sheet, adhesive layer, etc.). The additional layer information may be the burnup degree of the additional layers, or may be an ID number uniquely associated with the burnup degree of the additional layers. The burnup degree of the substrate sheet can be incorporated into calculation, determination, and the like by using a table that associates the ID number with the burnup degree of the additional layers. The burnup degree of the additional layers may be incorporated into the image-burnup degree conversion table. In this case, the burnup degree calculated using the table identified corresponding to the printing condition is the sum of the burnup degree of the printed layer alone and the burnup degree of the additional layers, which may be taken as the burnup degree of the printed layer. Alternatively, the burnup degree of the additional layers may be added to the burnup degree of the printed layer alone calculated using the table, which may be taken as the burnup degree of the printed layer. The calculated burnup degree of the printed layer can be compared with the reference value of the burnup degree of the printed layer (the reference value of the total burnup degree of the printed layer and the additional layers). Alternatively, the burnup degree of the additional layers may be subtracted from the reference value of the burnup degree of the laminated sheet to calculate the reference value of the burnup degree of the printed layer alone. In this case, the burnup degree of the printed layer calculated using the table can be compared with the reference value of the burnup degree of the printed layer alone.

The burnup degree may be a single variable or a plurality of variables. The burnup degree standard may be a standard related to a single element (e.g., total heat release amount), or may be a standard related to multiple elements (e.g., total heat release amount and heat release rate). The number of variables related to the burnup degree and the number of elements related to the burnup degree may be the same or different.

Next, based on the calculated burnup degree, it is determined whether the laminated sheet satisfies the burnup degree standard (step S104).

The order of operation and determination is not particularly limited. For example, the burnup degree may be a calculation for each pixel of the entire printed image data (e.g., all pixels), and then a determination may be performed. Alternatively, "calculation of the burnup degree" and "comparison with reference value" may be alternately performed, for example, calculation of the burnup degree and comparison with the reference value are performed for a specific sampling area in the printed image data and then, the burnup degree calculation and comparison with the reference value are performed for a next sampling area. The determination using the sampling area is not essential. The determination may be made by comparing the burnup degree calculated for the entire printed image data with the reference value. The burnup degree is not necessarily calculated for the entire printed image data, and may be calculated for only a part of the printed image data as long as appropriate determination can be made.

The determination as to whether the burnup degree standard is satisfied may be performed by directly and/or indirectly comparing the calculated burnup degree with the reference value determined corresponding to the burnup degree standard. If the burnup degree of the laminated sheet is calculated and the physical quantity or unit representing the burnup degree is the same as the physical quantity or unit representing the reference value in the burnup degree standard, the burnup degree may be directly compared with the reference value. For example, if the calculated burnup degree is the thickness of the laminated sheet and the reference value of the burnup degree of the laminated sheet is also the thickness, the burnup degree may be directly compared with the reference value.

If the physical quantity or unit representing the burnup degree is not the same as the physical quantity or unit representing the reference value in the burnup degree standard, at least one of the calculated burnup degree and the reference value in the burnup degree standard may be converted such that both can be compared with each other. For example, in the case where the burnup degree to be calculated is the weight of the paint and the reference value in the burnup degree standard is the total heat release amount, (1) the weight of the paint may be converted into the total heat release amount in consideration of the components of the paint, the material of the substrate sheet, etc. (the heat release amount of the base layer and the additional layer may be added to the heat release amount of the paint) and the converted total heat release amount may be compared to the reference value in the burnup degree standard, or 2) the reference value (total heat release amount) in the burnup degree standard may be converted into the reference value of the weight of the acceptable paint in consideration of the components of the paint, the material of the substrate sheet, etc. (the heat release amount of the base layer and the additional layers may be subtracted from the total heat release of the laminated sheet) and the calculated burnup degree may be compared with the reference value of the weight of the paint. It is noted that the burnup degree and the reference value are not necessarily specific physical quantities, and the units are not necessarily specified. Various calculation or determination methods can be adopted, as long as it is possible to determine whether the burnup degree standard of the laminated sheet is satisfied based on the calculated burnup degree.

An upper limit of the burnup degree of the printed layer may be previously found by experiments or the like such that the burnup degree of the laminated sheet is satisfied. For example, when the burnup degree of the substrate sheet (and the adhesive layer) cannot be ignored, the upper limit may be different depending on the type of substrate sheet. The upper limit can be considered as a value converted from the reference value in the burnup degree standard. Alternatively, a function for converting the calculation result using the table into the unit system of the burnup degree standard may be previously obtained by experiment or the like. In this case, the result calculated using the table can be further converted using the function and compared with the reference value in the burnup degree standard.

The determination result may be outputted to the outside of the system, including the network and the recording medium, by using the communication device, the media writer, or the like, may be displayed on a display device such as the printer and the display, or may be recorded in the storage unit 20.

Note that the determination in step S104 refers to determination on the computer, simple determination, and determination by simulation, which are performed based on the calculated burnup degree without actually performing the combustion test. If it is determined in step S104 that the laminated sheet satisfies the burnup degree standard, when the laminated sheet is manufactured in accordance with the printing condition and the printed image data, there is a high probability that the manufactured laminated sheet satisfies the burnup degree standard in the combustion test. For example, the high probability means that the probability is 80% or more, 85% or more, 90% or more, 95% or more, 99% or more, and 99.9% or more.

Next, if it is determined that the burnup degree standard is satisfied, the printer 30 forms the printed layer in accordance with the printing condition and the printed image data in response to a command of the arithmetic processing unit 10 (step S105), and operation of the laminated sheet manufacturing system 100 is terminated (end).

"If it is determined that the burnup degree standard is satisfied" may be "only if it is determined that the burnup degree standard is satisfied". If it is not determined that the burnup degree standard is satisfied, a standard non-satisfaction processing may be executed. For example, any of following A) to E) may be executed as the standard non-satisfaction processing.

A) The processor generates and outputs printed image data with a determination result in which the determination result is added to the printed image data.

B) The processor generates and outputs burnup degree image data indicating the magnitude of the burnup degree in the printed image data.

C) The processor generates and outputs high burnup degree site image data in which the sampling area that does not satisfy the burnup degree standard in a unit of sampling area is marked in the printed image data.

D) If it is determined that the laminated sheet satisfies the burnup degree standard, in response to the command of the processor, the printer forms the printed layer for the sampling area having the highest burnup degree in the printed image data in accordance with the printing condition and the printed image data.

E) A warning signal is outputted.

The printed image data with a determination result, the burnup degree image data, and the high burnup degree site image data are examples of image data for reference non-satisfaction processing. That is, as the reference non-satisfaction processing, the processor can generate and output the image data for reference non-satisfaction processing.

Note that steps S104 and S105 are not essential. Step S105 may be omitted and the reference non-satisfaction processing may be performed as a determination method, a determination apparatus, and a determination program. Steps S105 and S104 may be omitted and the reference non-satisfaction processing may be performed as an arithmetic method, an arithmetic device, an arithmetic program, or the like.

Second Embodiment

Figure 3:
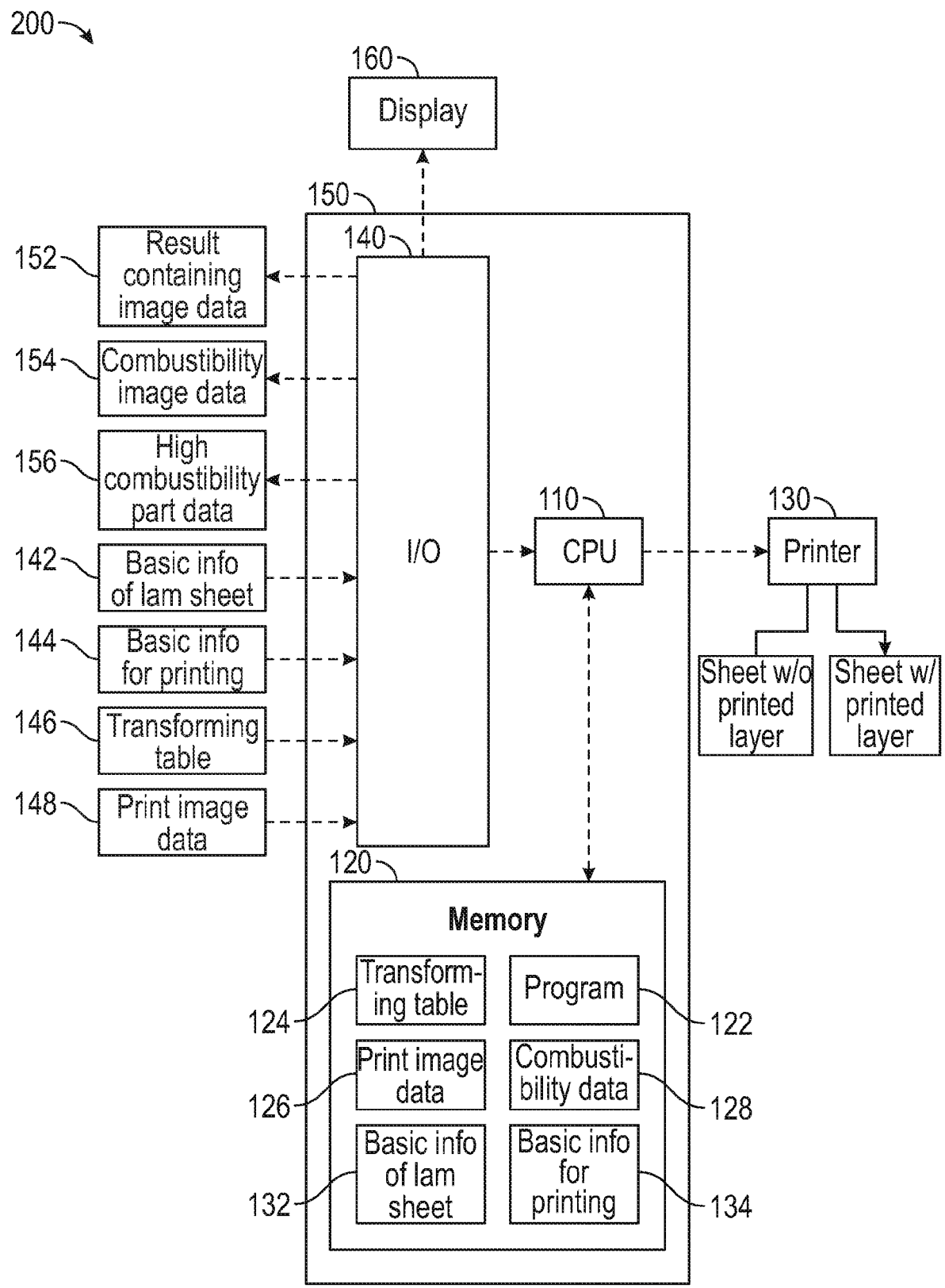
FIG. 3 is a block diagram illustrating an example of a schematic configuration of a laminated sheet manufacturing system according to a second embodiment.

FIG. 3 is a block diagram illustrating an example of a schematic configuration of a laminated sheet manufacturing system according to a second embodiment.

A laminated sheet manufacturing system 200 includes a printer 130, a display 160, and a computer 150 including a CPU 110, a storage device 120, and an input/output device 140.

The CPU 110 can have the same configuration as the arithmetic processing unit 10. The storage device 120 can have the same configuration as the storage unit 20. The printer 130 can have the same configuration as the printer 30. The display 160 is communicably connected to the CPU 110. A CRT, a liquid crystal display, and an OLED display may be used as the display 160.

Figure 4:
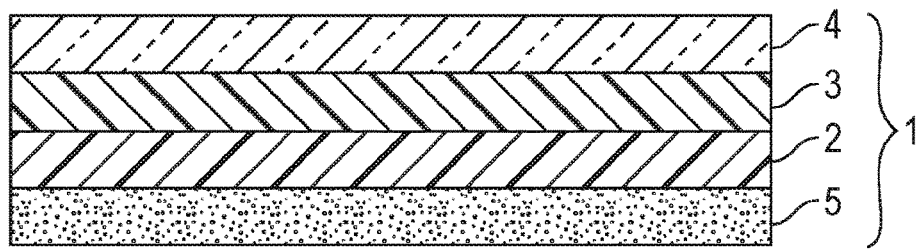
FIG. 4 is a sectional view illustrating a schematic configuration of a cross section of a laminated sheet in the second embodiment.

FIG. 4 is a sectional view illustrating a schematic configuration of a cross section of a laminated sheet in the second embodiment. As illustrated in FIG. 4, in a laminated sheet 1, an ink layer 3 (design layer) is disposed on a first main surface of a substrate sheet 2, a textured layer 4 (surface layer) is disposed on the ink layer 3, and an adhesive layer 5 is disposed on a second main surface of the substrate sheet 2.

At least one type of resin layer selected from the group consisting of polyvinyl chloride, polyurethane, polyethylene, polypropylene, vinyl chloride-vinyl acetate resin, acrylic resin, cellulose resin, and fluorine resin may be used as the substrate sheet 2.

The substrate sheet 2 may be colored or colorless. The substrate sheet 2 may be opaque, translucent or transparent. The substrate sheet 2 may have a substantially smooth surface, or may have a structured surface that can be formed by surface processing such as embossing. Various decorative properties can be imparted to the substrate sheet 2 by setting the appearance or shape of the substrate sheet 2 as described above.

From one aspect, the substrate sheet 2 includes a transparent polyvinyl chloride resin layer and a colored polyvinyl chloride resin layer. In the substrate sheet of this aspect, the colored polyvinyl chloride resin layer can be supported or protected by the transparent polyvinyl chloride resin layer to impart durability to the decorative property of an extensible film. The extensible film from this aspect can be suitably used, for example, for application to the interior or exterior of a building or vehicle.

The thickness of the substrate sheet 2 may be, for example, about 25 µm or more, about 50 µm or more, or about 80 µm or more, and about 5 mm or less, about 1 mm or less, or about 0.5 mm or less.

From some aspects, the tensile elongation rate of the substrate sheet 2 is about 10% or more, about 20% or more, or about 30% or more, and about 400% or less, about 350% or less, or about 300% or less. The tensile elongation rate of the substrate sheet 2 is a value calculated as [chuck spacing at break (mm)−chuck spacing before elongation (mm) (=100 mm)]/chuck spacing before elongation (mm) (=100 mm)× 100(%), when a sample having a width of 25 mm and a length of 150 mm is prepared and the sample is stretched at a temperature of 20° C., a tensile speed of 300 mm/min, and a chuck spacing of 100 mm using a tensile tester until the sample is broken.

Examples of the ink layer 3 include a color layer exhibiting a paint color, a metal color or the like, and a pattern layer imparting a pattern of wood grain or stone, a logo, a design, or the like to the structure. The ink layer 3 may be composed of a UV curable ink. For example, the ink layer may use inorganic pigments such as titanium oxide, carbon black, yellow lead, yellow iron oxide, red iron oxide; phthalocyanine pigments such as phthalocyanine blue and phthalocyanine green; organic pigments such as azo lake pigments, indigo pigments, perinone pigments, perylene pigments, quinophthalone pigments, dioxazine pigments, quinacridone pigments such as quinacridone red; and binder resins in which aluminum glitter materials such as aluminum flakes, vapor deposited aluminum flakes, metal oxide coated aluminum flakes, colored aluminum flakes, or pearl glitter materials such as mica coated with a metal oxide such as titanium or iron oxide and synthetic mica are dispersed as pigments. The thickness of the ink layer 3 may vary, and may generally be about 5 µm or more, about 10 µm or more, or about 20 µm or more, and about 300 µm or less, about 200 µm or less, or about 100 µm or less.

The textured layer 4 may be composed of a UV curable resin. The textured layer 4 may use various resins, for example, acrylic resin containing polymethyl methacrylate (PMMA), polyurethane, ethylene/tetrafluoroethylene copolymer (ETFE), fluorine resin such as polyvinylidene fluoride (PVDF), methyl methacrylate/vinylidene fluoride copolymer polymer (PMMA/PVDF), polyolefin such as polyvinyl chloride (PVC), polycarbonate (PC), polyethylene (PE), polypropylene (PP), polyester such as polyethylene terephthalate (PET), polyethylene naphthalate, ethylene/acrylic acid copolymer (EAA) and its ionomer, copolymers of ethylene/ethyl acrylate copolymer, ethylene/vinyl acetate copolymer and the like. From the viewpoint of weather resistance, acrylic resin, polyurethane, fluorocarbon resin and polyvinyl chloride may be used. From the viewpoints of scratch resistance and small environmental impact when incinerated or landfilled as waste, acrylic resins and polyurethanes may be used.

The textured layer 4 can be formed by coating the resin composition on the ink layer 3 and the like by printing. The thickness of the textured layer 4 may vary, and may be generally about 1 µm or more, about 5 µm or more, or about 10 µm or more, about 100 µm or more, about 400 µm or less, 100 µm or less, about 80 µm or less, or about 50 µM or less. The thickness of the textured layer may be 5 µm to 400 µm, 10 µm to 200 µm, and 20 µm to 100 µm. When the printed layer is applied to a substrate having a complicated shape, the thickness of the textured layer 4 is advantageously small in terms of shape followability, and may be, for example, about 80 µm or less, or about 50 µm or less. On the other hand, in the case of imparting high light resistance and/or weather resistance to the structure, the thickness of the textured layer 4 is advantageously large, and may be, for example, about 5 µm or more, or about 10 µm or more.

The textured layer 4 may have an irregular-convex pattern. As the scale of irregularities, the height difference between the top and the bottom of the irregularities may be 1 µm or more, 5 µm or more, 10 µm or more, 20 µm or more, 50 µm or more, 100 µm or more, 200 µm or more, and may be 500 µm or less, 400 µm or less, 300 µm or less, 200 µm or less, 100 µm or less, 50 µm or less, 20 µm or less, 10 µm or less.

The height difference between the top and the bottom of the irregularities may be 5 µm to 400 µm, 10 µm to 200 µm, or 20 µm to 100 µm.

The textured layer 4 may optionally contain a benzotriazole, a UV absorber such as Tinuvin 1130 (manufactured by BASF), or a hindered amine light stabilizer (HALS) such as Tinuvin 292 (manufactured by BASF). By using an ultraviolet light absorber, a hindered amine light stabilizer, etc., the color change, fading, and deterioration of the colorant contained in the design layer or the like of the decorative laminate sheet, in particular, the organic pigments having relatively high sensitivity to light such as ultraviolet light can be effectively prevented. The textured layer 4 may contain a hard coat material, a gloss agent, etc., and may have an additional hard coat layer. The textured layer 4 may be transparent, translucent, or opaque to provide the desired appearance.

The adhesive layer 5 may use a commonly used acrylic, polyolefin, polyurethane, polyester, or rubber-based solvent type, emulsion type, pressure sensitive type, thermal type, thermosetting type, or ultraviolet curing type adhesive. The thickness of the adhesive layer may be generally about 5 µm or more, 10 µm or more, or about 20 µm or more, and about 100 µm or less, about 80 µm or less, or about 50 µm or less. A non-combustible material and a flame retardant material may be used as the adhesive layer 5. The configuration of the adhesive layer 5 can be reflected on the calculation of the burnup degree of the printed layer or the determination as to whether the burnup degree standard is satisfied, through the printing condition.

A liner may be applied to the surface of the adhesive layer 5. Examples of liners include paper; plastic materials such as polyethylene, polypropylene, polyester and cellulose acetate; and papers coated with such plastic materials. These liners may have surfaces release-treated with silicone or the like. The thickness of the liner is generally about 5 µm or more, about 15 µm or more, or about 25 µm or more, and about 500 µm or less, about 300 µm or less, or about 250 µm or less.

The application of the laminated sheet of the present disclosure is not particularly limited. For example, the laminated sheet of the present disclosure can be used as an interior material for walls, stairs, ceilings, columns, partitions, and so on of buildings such as office buildings, apartments, or houses, or an exterior material for outer walls and so on. In addition, the laminated sheet can be used as an interior or exterior of various traffic vehicles such as railway vehicles, ships, airplanes, automobiles, including motorcycles and four-wheeled vehicles. Furthermore, the laminated sheet can also be used as a covering material of all articles, such as road signs, signboards, furniture, and electric appliance.

Figure 5:
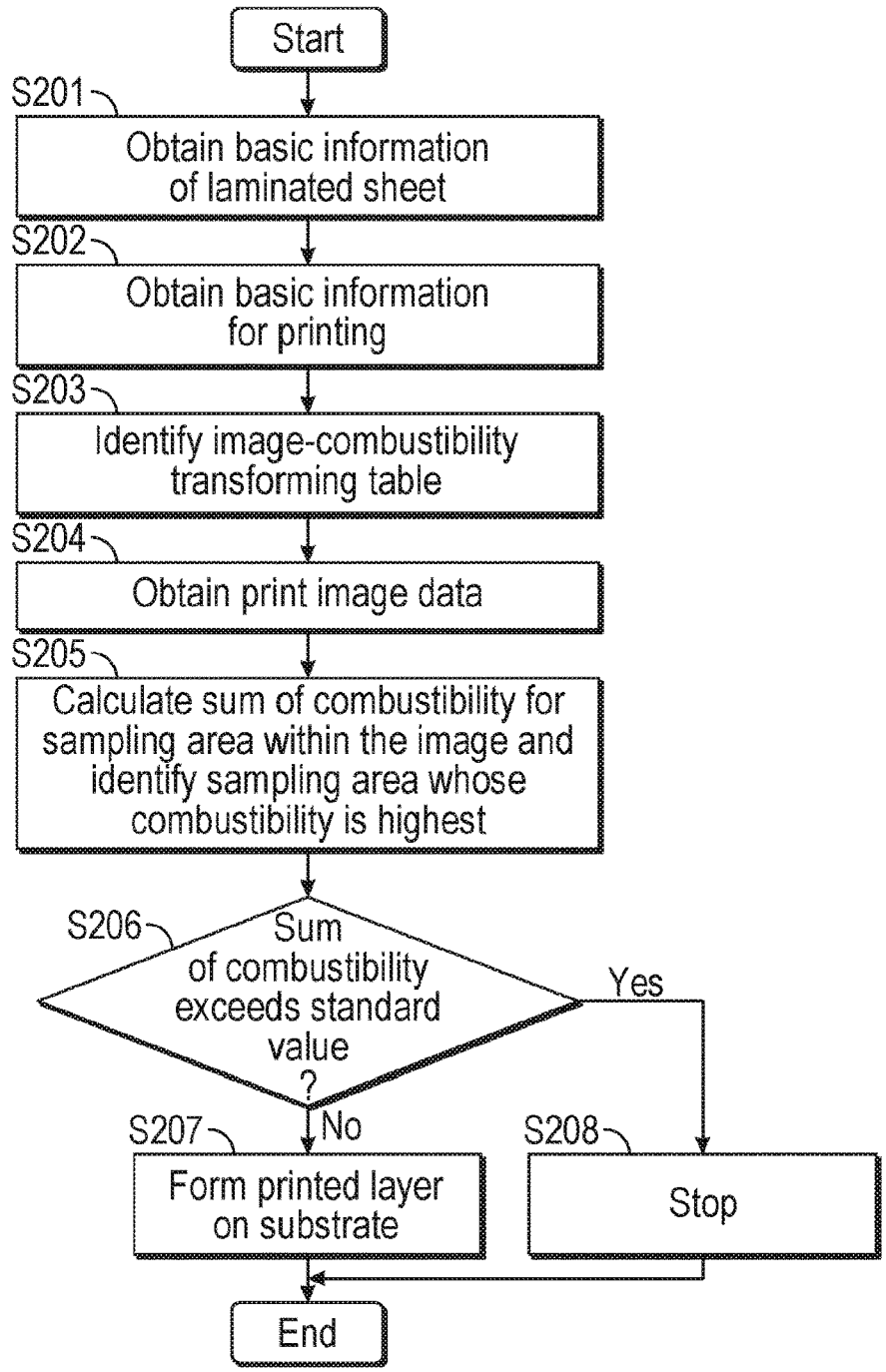
FIG. 5 is a flowchart illustrating an example of an outline of a laminated sheet manufacturing method according to the second embodiment.

FIG. 5 is a flowchart illustrating an example of an outline of a laminated sheet manufacturing method according to the second embodiment. The method is a method of operating the laminated sheet manufacturing system 200, and is realized by causing the CPU 110 of the computer 150 to execute a program 122 stored in the storage unit 120.

When operation of the laminated sheet manufacturing system 200 is started (start), laminated sheet basic information 142 is acquired (step S201). The laminated sheet basic information 142 is information about a portion of the laminated sheet other than the printed layer in the printing condition, and may include the burnup degree per unit area of the substrate sheet, and the burnup degree per unit area of the adhesive layer. The laminated sheet basic information 142 is inputted from the outside of the system, including the network and the recording medium, to the input/output device 140 via the communication device, the media reader or the like, and stored in the storage device 120 as laminated sheet basic information 132.

Next, printing basic information is acquired (step S202). The printing basic information 144 is information about a portion of the printed layer in the printing condition, and may include the type of printer, resolution, types of ink and texture material, and the number of times of overprinting.

The printing basic information 144 is inputted from the outside of the system, including the network and the recording medium, to the input/output device 140 via the communication device, the media reader, or the like, and stored in the storage device 120 as printing basic information 134.

Next, an image-burnup degree conversion table is identified (step S203). The image-burnup degree conversion table 146 is inputted to the input/output device 140 and stored in the storage unit 120 as an image-burnup degree conversion table 124. Based on the printing basic information (type of printer, resolution, type of ink and texture material, and the number of times of overprinting), a specific image-burnup degree conversion table is selected from among a plurality of tables recorded in the storage device 120.

Next, printed image data is acquired (step S204). The printed image data 148 is inputted from the outside of the system, including the network and the recording medium, to the input/output device 140 via the communication device, the media reader or the like, and stored in the storage device 120 as printed image data 126. The resolution of the printed image data matches the resolution of the printer. In the present embodiment, the printed image data 126 has four pieces of density data of C (cyan), M (magenta), Y (yellow), and T (texture) for each pixel.

Next, the total burnup degree of the printed layer for the sampling area (hereinafter, "burnup degree of sampling area") is calculated from the image-burnup degree conversion table 124 and the printed image data 126, and recorded in the storage device 120 as burnup degree data 128 (step S205). The "burnup degree" in this embodiment is the total weight of the ink and the textured material applied to the sampling area. The burnup degree may include the burnup degree of the base layer or the additional bed in the sampling area.

Figure 6A:
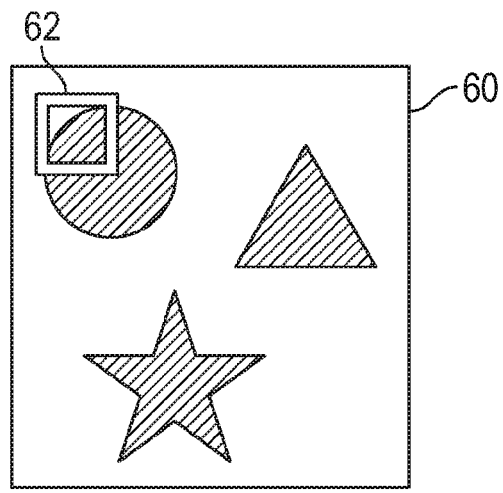
FIG. 6A is a schematic view illustrating a relationship between printed image data and a sampling area in the second embodiment.
Figure 6B:
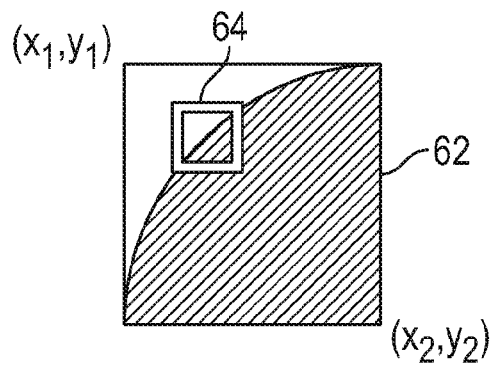
FIG. 6B is a schematic view illustrating the sampling area in the second embodiment.
Figure 6C:
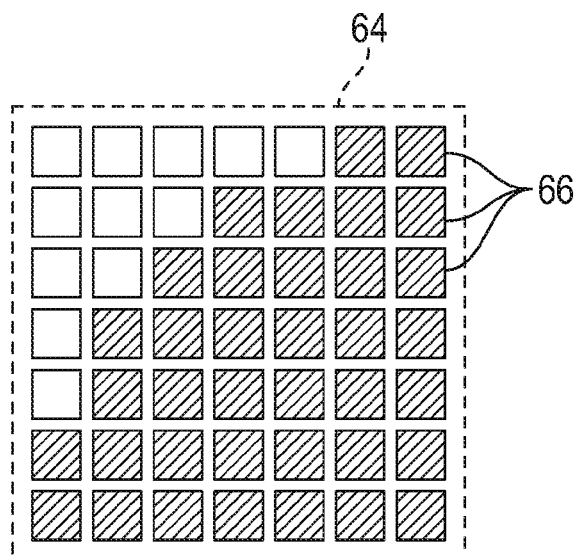
FIG. 6C is a schematic view illustrating a partially enlarged area of the sampling area in the second embodiment.

FIGS. 6A, 6B, and 6C are schematic views illustrating the relationship between the printed image data, the sampling area, and pixels in the second embodiment. As illustrated in FIGS. 6A and 6B, in the present embodiment, a sampling area 62 is an area obtained by cutting out a part of printed image data 60. For example, the printed image data 60 is a rectangular area of 1000 mm×1000 mm, and the sampling area 62 is a rectangular area of 100 mm×100 mm.

As illustrated in an enlarged portion 64 of FIG. 6C, the sampling area 62 consists of a matrix of a plurality of pixels 66. Assuming that the resolution is 100 pixels per 1 mm, the printed image data is 100000 pixels×100000 pixels, and the sampling area is 10000 pixels×10000 pixels. Assuming that the coordinates of the pixel at the upper left corner of the printed image data 60 are (0, 0), the coordinates of the pixels at the lower right corner are (99999, 99999). Assuming that the coordinates of the pixel at the upper left corner of the sampling area 62 are $(x_1, y_1)$ and the coordinates of the pixel at the lower right corner are $(x_2, y_2)$, the relations of $x_2=x_1+9999$ and $y_2=y_1+9999$ hold.

In the present embodiment, for example, the burnup degree of each sampling area is sequentially calculated from $(x_1, y_1)=(0, 0)$ to $(x_1, y_1)=(90000, 0)$ while shifting by 0.1 mm (10 pixels) and further, the burnup degree of each sampling area is sequentially calculated from $(x_1, y_1)=(0, 10)$ to $(x_1, y_1)=(90000, 10)$ while shifting by 0.1 mm (10 pixels). In this manner, the burnup degree of each sampling area is sequentially calculated to $(x_1, y_1)=(90000, 90000)$ while shifting by 0.1 mm (10 pixels) in an x direction and a y direction comprehensively on the entire surface or the whole of the printed image data, and stored in the storage device 120.

Assuming that the printed layers or laminated sheets formed by the printed image data are repeatedly arranged (applied) as tiles, the burnup degree of the sampling area near the edge of the printed image data may be calculated using an opposite portion of the printed image data.

In this case, the burnup degree of each sampling area may be calculated and recorded in the storage device 120 until $(x_1, y_1)$ becomes (99990, 99990).

In the calculation of the burnup degree using the opposite portion of the printed image data, for example, the burnup degree of the sampling area at $(x_1, y_1)=(99990, 99990)$ may be, in the printed image data, a sum of the burnup degree of the portion including the upper left corner (99990, 99990) and the lower right corner (99999, 99999), the burnup degree of the portion including the upper left corner (99990, 0) and the lower right corner (99999, 9990), the burnup degree of the portion including the upper left corner (0, 99990) and the lower right corner (9990, 99999), and the burnup degree of the portion including the upper left corner (0, 0) and the lower right corner (9990, 9990).

FIG. 7 is a schematic view illustrating a density matrix of each ink and texture material corresponding to the enlarged image in FIG. 6C in the second embodiment. As illustrated in the figure, in the present embodiment, cyan density data in the printed image data is stored in a cyan density matrix $A_C$, magenta density data in the printed image data is stored in a magenta density matrix $A_M$, yellow density data in the printed image data is stored in a yellow density matrix $A_Y$, and texture density data in the printed image data is stored in a texture density matrix $A_T$. The density data is represented as a percentage from 0 to 100. A numerical value described in each of small cells of each matrix is density data. In the present embodiment, at coordinates (x, y), the cyan density data is denoted as $A_C(x, y)$, the magenta density data is denoted as $A_M(x, y)$, the yellow density data is denoted as $A_Y(x, y)$, and the texture density data is denoted as $A_T(x, y)$.

FIG. 8 is a schematic view illustrating an image-burnup degree conversion table in the second embodiment. In the present embodiment, the image-burnup degree conversion table is set for each ink and texture material. The applied amount $B_C$ of the cyan paint is a function of the cyan density value $A_C$ in the image data. The applied amount $B_M$ of the magenta paint is a function of the magenta density value $A_M$ in the image data. The applied amount $B_Y$ of the yellow paint is a function of the yellow density value $A_Y$ in the image data. The applied amount $B_T$ of the texture paint is a function of the texture density value $A_T$ in the image data. That b is a function of a means that if a is determined, b is uniquely determined. The density value and the applied amount need not have a proportional relation therebetween, and may have a non-linear relation therebetween. Typically, the applied amount B is a monotonically increasing function in a broad sense for the density value A. That is, if $A_2>A_1$, the relation of $B(A_2) \geq B(A_1)$ is established.

FIG. 9 is an equation for finding the burnup degree of the sampling area in the second embodiment. As described above, starting, the burnup degree of each sampling area is sequentially calculated from $(x_1, y_1)=(0, 0)$ to $(x_1, y_1)=(90000, 90000)$ and recorded in the storage device 120.

In the above description, the burnup degree $B(x_1, y_1)$ is calculated for each sampling area as illustrated in FIG. 9. However, the burnup degree for all pixels may be calculated and recorded and then, for each sampling area, the burnup degree of the pixels belonging to the sampling area may be summed to calculate the total burnup degree of the sampling area.

In step S205, when the calculation of the total burnup degree of each sampling area is completed, the sampling area having the highest total burnup degree is identified.

Next, it is determined whether the total burnup degree of the sampling area having the highest total burnup degree exceeds a reference value of the burnup degree in the unit of sampling area (step S206).

If the total burnup degree does not exceed the reference value, it is determined that the laminated sheet satisfies the burnup degree standard, that is, the probability that the laminated sheet satisfies the burnup degree standard in the combustion test is high. On the contrary, if the total burnup degree exceeds the reference value, the laminated sheet does not satisfy the burnup degree standard, that is, the probability that the laminated sheet satisfies the burnup degree standard in the combustion test is not high.

Instead of the highest total burnup degree of the sampling area, an average burnup degree of the sampling area may be used. The average burnup degree of the sampling area refers to an average value of the burnup degree in a plurality of sampling areas, in the case where the burnup degree is calculated for the plurality of sampling areas.

In the present embodiment, the reference value of the burnup degree can be found as follows. The burnup degree standard of the laminated sheet is determined by the reference value of the total heat value, and when the same type of substrate sheet, adhesive layer and paint are used, a threshold value of the total weight of the paint applied per sampling area, at which the laminated sheet does not satisfy the burnup degree standard, can be previously determined by experiment. The threshold value of the total weight can be adopted as the reference value of the burnup degree. For safety, the total weight which is lower than the threshold value by a fixed amount may be adopted as the reference value of the burnup degree.

If it is determined in step S206 that the total burnup degree does not exceed the reference value (NO), in accordance with the command of the CPU 110, the printer 130 prints the ink layer 3 and the textured layer 4 on the first main surface of the substrate sheet 2 (step S207), and operation of the laminated sheet manufacturing system 200 is terminated (end).

If it is determined in step S206 that the total burnup degree exceeds the reference value (YES), the ink layer 3 and the textured layer 4 are not printed on the first main surface of the substrate sheet 2, operation of the laminate sheet manufacturing system 200 is stopped (step S208), and the operation is terminated (end).

With the stop of operation in step S208, various processing may be executed as follows.

For example, the CPU 110 may generate and output printed image data with determination result 152 in which the determination result is added to the printed image data 148. The printed image data with determination result 152 may be stored in the storage device 120, or may be outputted to the outside of the system via the input/output device 140. FIG. 10 is a conceptual view illustrating an example of printed image data with a determination result in the second embodiment. In the example illustrated in the figure, a margin is added to the printed image data, and a character string "NOT PASSED" which is the determination result is embedded in the margin. If it is determined that the total burnup degree does not exceed the reference value, for example, the string "PASSED" may be embedded. The margin is not essential, and the determination result may be embedded in an image portion of the printed image data using a digital watermark or the like, or may be written in a header portion or the like of the printed image data file.

The CPU 110 may generate and output burnup degree image data 154 indicating the magnitude of the burnup degree level in the printed image data 148. The burnup degree image data 154 may be stored in the storage device 120, or may be outputted to the outside of the system via the input/output device 140. FIG. 11 is a conceptual view illustrating an example of a burnup degree matrix obtained by enlarging a part of the burnup degree image data in the second embodiment. In the example illustrated in the figure, the burnup degree is represented by a numerical value from 0 to 100, and the burnup degree corresponding to each pixel of the printed image data is taken as the density value of each pixel. FIG. 12 is a conceptual view illustrating an example of burnup degree image data in the second embodiment. The burnup degree image data itself may be grayscale image data having the same size and resolution as the printed image data.

In the example illustrated in the figure, a circle pattern portion has the highest burnup degree and as a result, is illustrated in darker color. In the case where the burnup degree is a thickness, a pixel exceeding the reference value may be indicated by a specific color (e.g., a color different from grayscale having a certain saturation or more, such as red and blue).

The CPU 110 generates and outputs high burnup degree site image data 156 in which the sampling area that does not satisfy the burnup degree standard in the unit of sampling area is marked in the printed image data 148. The high burnup degree site image data 156 may be stored in the storage device 120, or may be output to the outside of the system via the input/output device 140. FIG. 13 is a conceptual view illustrating an example of high burnup degree site image data in the second embodiment. The burnup degree image data may itself be black and white binary image data having the same size and resolution as the printed image data. In the example illustrated in the figure, a circular pattern portion has the highest burnup degree and as a result, a certain area including the portion does not satisfy the burnup degree standard in the unit of sampling area, and is marked by being filled with black.

With the stop of operation in step S208, the CPU 110 may output a warning signal via the input/output device 140.

The above processing associated with the stop of operation in step S208 are not mutually exclusive, and may be executed in combination. For example, the warning signal may be output together with the printed image data with determination result 152.

If it is determined in step S206 that the total burnup degree does not exceed the reference value, in response to a command of the CPU 110, the printer 130 may form the printed layer in the sampling area having the highest burnup degree in the printed image data 148 in accordance with the printing condition and the printed image data 148. It may be confirmed whether the burnup degree standard is satisfied by performing the combustion test using the sampling area where the printed layer is formed as a sample.

FIG. 14 is an equation for finding the burnup degree of sampling area in a first modified example of the second embodiment. In the first modification, the calculated burnup degree is a maximum thickness C of the printed layer. As described above, the burnup degree of each sampling area is sequentially calculated from $(x_1, y_1)=(0, 0)$ to $(x_1, y_1)=(90000, 90000)$ and recorded in the storage device 120. In the first modified example, the image-burnup degree conversion table is set for each ink and texture material. A thickness $C_C$ of the cyan paint is a function of the cyan density value $A_C$ in the image data. A thickness $C_M$ of the magenta paint is a function of the magenta density value $A_M$ in the image data. A thickness $C_Y$ of the yellow paint is a function of the yellow density value $A_Y$ in the image data. A thickness $C_T$ of the texture paint is a function of the texture density value $A_T$ in the image data. That b is a function of a means that if a is determined, b is uniquely determined. The density value and the applied amount need not have a proportional relation therebetween, but may have a non-linear relation therebetween. Typically, the thickness C is a monotonically increasing function in a broad sense for the density value A. That is, when $A_2 > A_1$, $C(A_2) \geq C(A_1)$ is established. In the first modified example, the burnup degree of the laminated sheet can be evaluated based on the thickness of the paints. It is not essential to find the maximum value of thickness for each sampling area, and the maximum value of the thickness in the entire printed image data may be found. In such a case, each pixel can be also considered as the sampling area.

Figure 15:
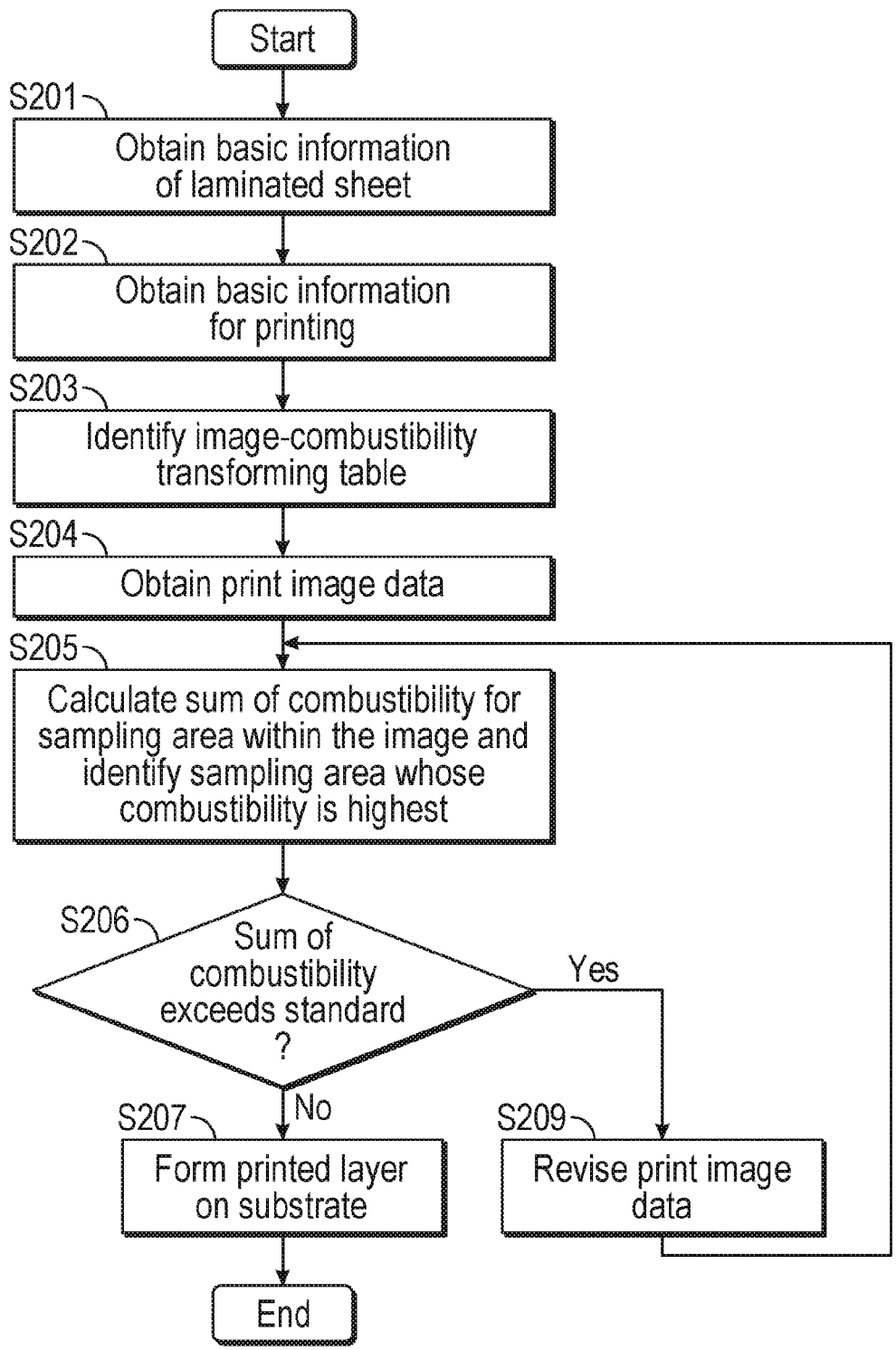
FIG. 15 is a flowchart illustrating an example of an outline of a laminated sheet manufacturing method according to a second modified example of the second embodiment.

FIG. 15 is a flowchart illustrating an example of an outline of a laminated sheet manufacturing method according to a second modified example of the second embodiment. The method is a method of operating the laminated sheet manufacturing system 200, and can be realized by causing the CPU 110 of the computer 150 to execute a program 122 stored in the storage unit 120.

The laminated sheet manufacturing method according to the second modified example in FIG. 15 is the same as the method in FIG. 5 except that the stop of operation in step S208 in FIG. 5 is replaced with correction of the printed image data in step S209. Therefore, steps other than step S209 are given the same reference numerals as those in FIG. 5, and detailed description thereof is omitted.

If it is determined in step S206 that the total burnup degree exceeds the reference value (YES), the printed image data is corrected without printing the ink layer 3 and the textured layer 4 on the first main surface of the substrate sheet 2 (step S209), and the burnup degree is calculated again and the sampling area where the burnup degree becomes maximum is identified (step S205). The correction of the printed image data may be manually performed, may be performed by the CPU 110, or may be manually performed with the support of the CPU 110.

For example, when the correction of the printed image data is manually performed, as a reference for the correction operation, images of the burnup degree image data, the high burnup degree site image data, and so on may be outputted by the CPU 110 via the input/output device 140 and/or the display 160.

For example, when the correction of the printed image data is performed by the CPU 110, the thickness, the applied amount, and the weight of the textured layer may be reduced at a constant rate, and the area to be reduced may extend over the entire printed image data, or only the sampling area exceeding the reference value.

EXPERIMENTAL EXAMPLES

The objects and advantages of the present disclosure will be further described using following experimental examples below. The particular materials and their amounts described in these experimental examples, as well as other conditions and details, should not be construed as unduly limiting the present disclosure. Unless otherwise stated, all parts, percentages (%), and ratio in the experimental examples and elsewhere in the specification are by weight.

Printing Conditions

An LED-type UV curing flatbed inkjet printer (UJF3042FX manufactured by Mimaki Engineering Co., Ltd., Tomi-shi, Nagano Prefecture, Japan) was used as the printer. 3M LUS200 magenta was used as ink. Printed image data in the CMYK color mode was prepared using Illustrator CS5 manufactured by Adobe.

The printed image data had a resolution of 720 dpi, and printing was performed on a 47 μm-thick white polyvinyl chloride film (hereinafter referred to as a PVC film). The printing mode was 720×600 VD 16 pass Unidirectional Print, and the paper profile (Media profile) was UV PET.

Creation of Image-Burnup Degree Conversion Table

Single-color solid-painted printed image data in which density data was changed from 10% to 100% in 10% steps, was printed to create an image-burnup degree conversion table. The printed layer was cut with a cutter knife, and thickness of the cut cross section was measured by using a thickness gauge (PC-465N manufactured by TECLOCK). The weight of the printed layer was determined by measuring the weight of a sample punched out with a circular punch of 13 mm in diameter.

Figure 16:
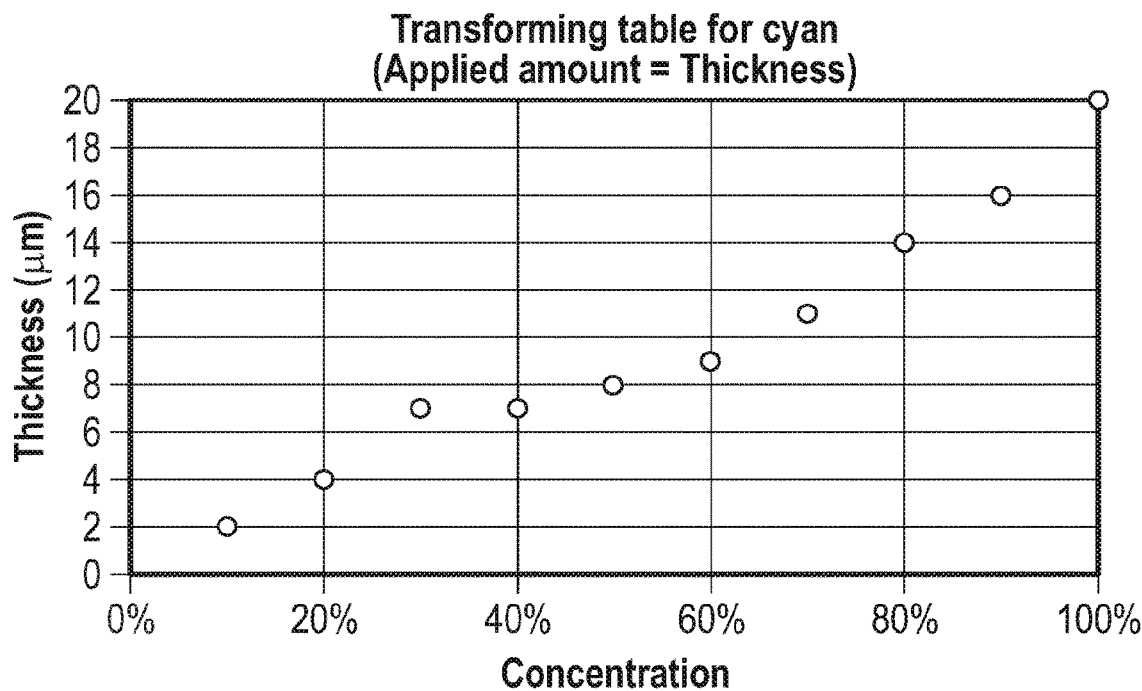
FIG. 16 is a view illustrating an image-burnup degree conversion table acquired in an experimental example.

The results acquired when the applied amount is the thickness of the printed layer are illustrated in Table 1 and FIG. 16 below.

TABLE 1

| Density | 10% | 20% | 30% | 40% | 50% | 60% | 70% | 80% | 90% | 100% |
|---|---|---|---|---|---|---|---|---|---|---|
| Thickness (μm) | 2 | 4 | 7 | 7 | 8 | 9 | 11 | 14 | 16 | 20 |

Figure 17:
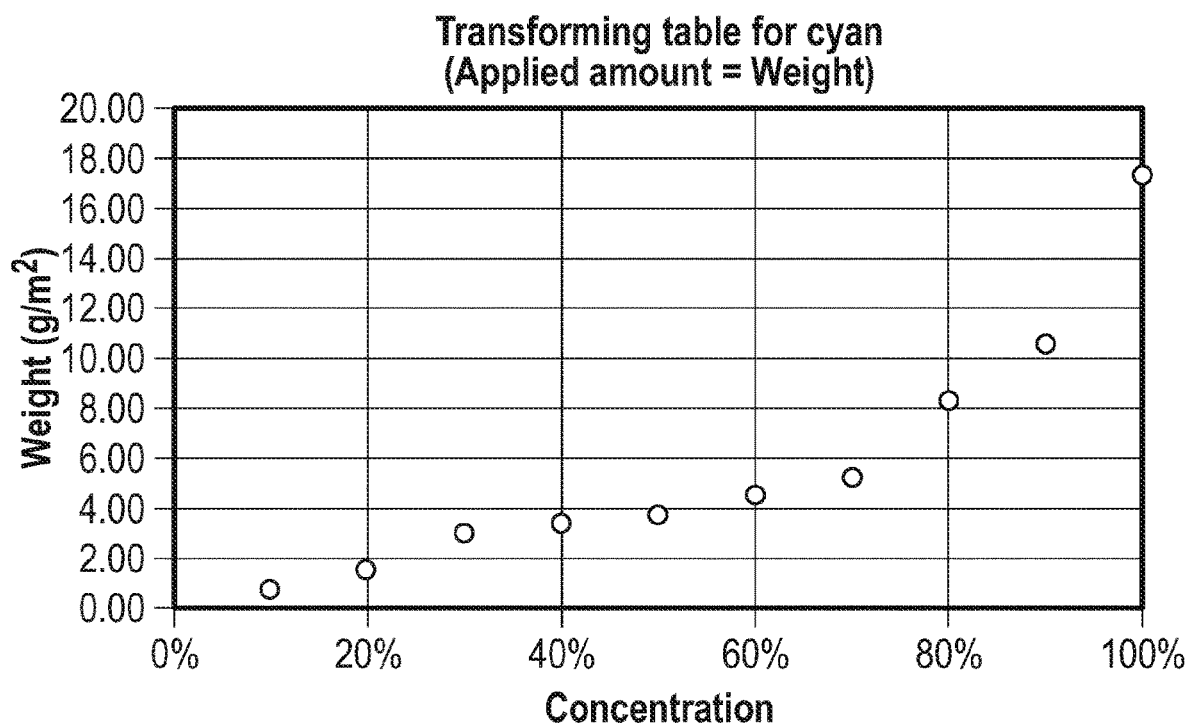
FIG. 17 is a view illustrating an image-burnup degree conversion table obtained in an experimental example.

The results acquired when the applied amount is the weight per unit area of the printed layer are illustrated in Table 2 and FIG. 17 below.

TABLE 2

| Density | 10% | 20% | 30% | 40% | 50% | 60% | 70% | 80% | 90% | 100% |
|---|---|---|---|---|---|---|---|---|---|---|
| Weight (g/m$^2$) | 0.75 | 1.51 | 3.02 | 3.39 | 3.77 | 4.52 | 5.28 | 8.29 | 10.55 | 17.34 |

Combustion Test

The test was performed by the cone calorimeter method in accordance with ISO 5660-1. Specifically, the heat release rate (HRR: Heat Release Rate, unit: kW/m$^2$) and the total heat release amount (THR: Total Heat Release, unit: MJ/m$^2$) were measured using a cone calorimeter (manufactured by Toyo-Seiki).

It is given that, if the time when HRR exceeds 200 kW/m$^2$ is 10 seconds or less, and the total heat release amount for 20 minutes is 8 MJ/m$^2$ or less, the burnup degree standard is satisfied.

Preparation of Combustion Test Sample

In ethyl acetate, adhesive polymer (Tg: −5° C., Mw: 500,000, solid: 33%) in which butyl acrylate (BA): 2-ethyl-hexyl-acrylate (2EHA): acrylonitrile (AN): acrylic acid (AA) are mixed at a ratio of 58:36:2:4, and a crosslinker composed of bisamide in toluene (1,1′-isophthaloyl-bis(2-methylaziridin) (solid: 5%, manufactured by 3M) was mixed with the non-volatile component in a ratio of 100:0.2 to form an adhesive. The adhesive was coated on a silicone coated polyethylene laminated paper (hereinafter referred to as liner) using a knife coater. The adhesive layer was dried at 95° C. for 5 minutes to obtain a 35 µm-thick pressure-sensitive adhesive layer. A PVC film (thickness: 47 µm) was laminated on the adhesive layer, and printing was made on a main surface of the PVC film, which was not in contact with the adhesive layer.

A printed layer was formed with following six types of patterns, and the printed film was applied to a plaster board (manufactured by Yoshino Gypsum, material: gypsum, thickness: 12.5 mm) to prepare a 100 mm×100 mm sample, which was used for the combustion test.

Experimental Example 1

A rectangular 300 mm×420 mm solid paint pattern having a density value of 90% was set. The number of times of overprinting was four.

A primer (WP246 manufactured by 3M) was applied at 10 g/m² on one side of a plaster board (thickness: 12.5 mm, 100 mm×100 mm). The printed PVC film was peeled off the liner and applied onto the primer.

The weight of the printed layer was calculated to be 42 g/m² using the image-burnup degree conversion table.

Experimental Example 2

Figure 18:
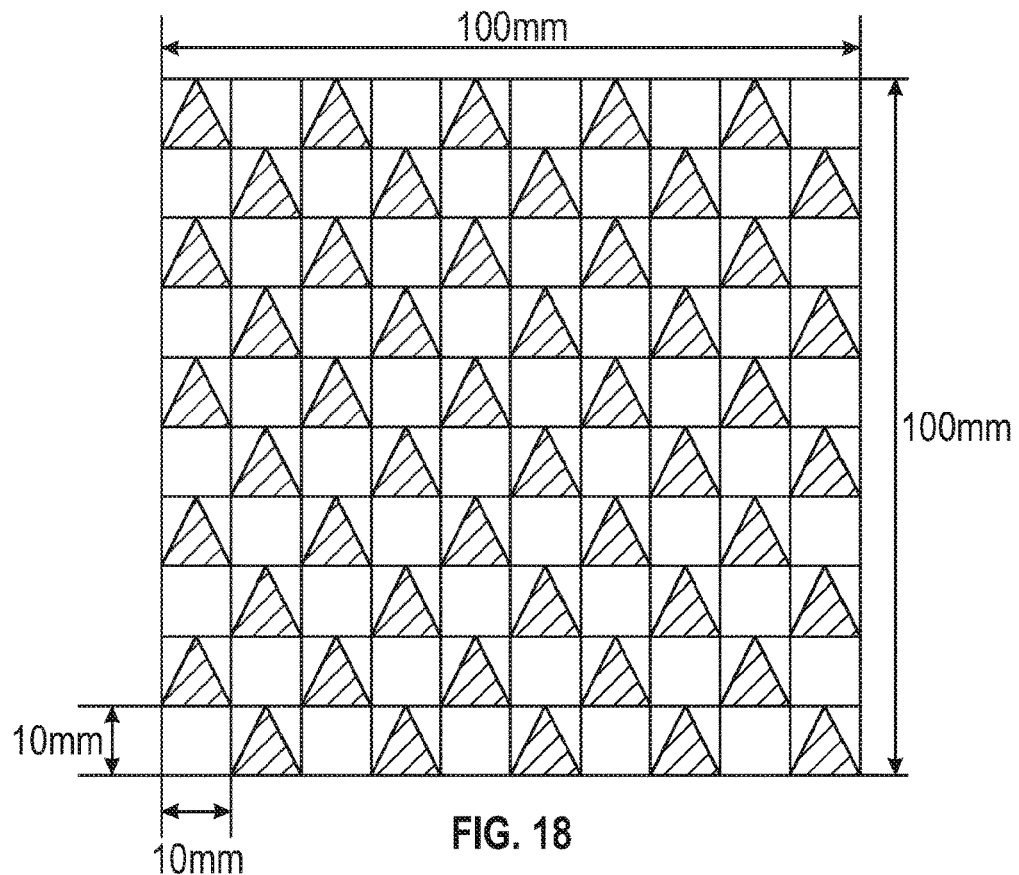
FIG. 18 is a view illustrating a printing pattern in Experimental Example 2.

A triangular repeated pattern having a density value of 100% in FIG. 18 was printed with 300 mm×420 mm. The number of times of overprinting was eight. In the pattern illustrated in FIG. 18, triangles with a base of 10 mm and a height of 10 mm are isochromatically solid-painted in the checkered manner on a 10×10 matrix including cells of 10 mm×10 mm. The area of the printed part was 25% of the whole.

A primer (DP900N3 manufactured by 3M) was applied at 10 g/m² on one side of a plaster board (thickness of 12.5 mm, 100 mm×100 mm). The printed PVC film was peeled off the liner and applied onto the primer.

The weight of the printed layer was calculated to be 35 g/m² using the image-burnup degree conversion table.

Experimental Example 3

A square with a side of 63.2 mm having a density value of 100% was isochromatically solid-painted. The number of times of overprinting was eight. The area of the printed part is 40% of the whole.

A primer (made by 3M: DP900N3) was applied at 10 g/m² on one side of a plaster board (thickness of 12.5 mm, 100 mm×100 mm). The printed PVC film was peeled off the liner and applied onto the primer.

The weight of the printed layer was calculated to be 55 g/m² using the image-burnup degree conversion table.

Experimental Example 4

Figure 19:
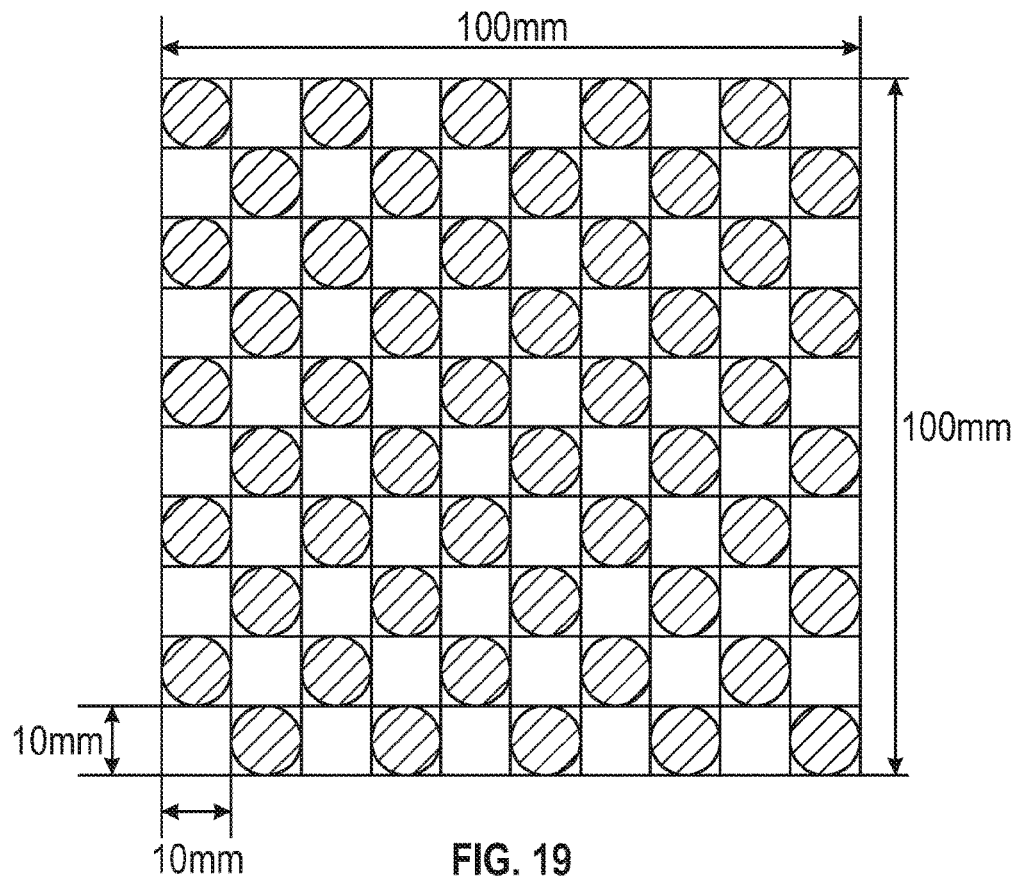
FIG. 19 is a view illustrating a printing pattern in Experimental Example 4.

A repeated pattern of circles illustrated in FIG. 19 having a density value of 100% was printed with 300 mm×420 mm. The number of times of overprinting was eight. In the pattern in FIG. 19, a circle with a diameter of 10 mm was isochromatically solid-painted in a checkered manner on a 10×10 matrix including cells of 10 mm×10 mm. The area of the printed part was 39.25% of the whole.

A primer (DP900N3 manufactured by 3M) was applied at 10 g/m² on one side of a plaster board (thickness of 12.5 mm, 100 mm×100 mm). The printed PVC film was peeled off the liner and applied onto the primer.

The weight of the printed layer was calculated to be 54 g/m² using the image-burnup degree conversion table.

Experimental Example 5

The same pattern (density value 100%, 10×10 matrix including each cell of 10 mm×10 mm, checkered pattern, triangle having a base of 10 mm and a height of 10 mm, the number of times of overprinting: 8) as in Example 2 (FIG. 18) was isochromatically solid-painted on a rectangular solid coating pattern of 300 mm×420 mm having a density value of 50% (the number of times of overprinting: 4).

A primer (DP900N3 manufactured by 3M) was applied at 10 g/m² on one side of a plaster board (thickness of 12.5 mm, 100 mm×100 mm). The printed PVC film was peeled off the liner and applied onto the primer.

The weight of the printed layer was calculated to be 50 g/m² using the image-burnup degree conversion table.

Experimental Example 6

A rectangular 300 mm×420 mm solid paint pattern having a density value of 90% was set. The number of times of overprinting was eight.

A primer (DP900N3 manufactured by 3M) was applied at 10 g/m² on one side of a plaster board (thickness of 12.5 mm, 100 mm×100 mm). The printed PVC film was peeled off the liner and applied onto the primer.

The weight of the printed layer was calculated to be 84 g/m² using the image-burnup degree conversion table.

Results

The results of the combustion test are illustrated in Table 3.

TABLE 3

| | Weight Of Printed Layer (g/m²) | HRR >200 kW/m² (sec) | THR (MJ/m²) | Burnup Degree Standard |
|---|---|---|---|---|
| Experimental Example 1 | 42 | 0 | 7.2 | Pass |
| Experimental Example 2 | 35 | 0 | 7.4 | Pass |
| Experimental Example 3 | 55 | 0 | 7.6 | Pass |
| Experimental Example 4 | 54 | 0 | 6.9 | Pass |
| Experimental Example 5 | 50 | 0 | 7.7 | Pass |
| Experimental Example 6 | 84 | 0 | 8.3 | Fail |

As illustrated in the table, there is a correlation between the weight of the printed layer and whether the laminated sheet satisfies the burnup degree standard, and whether the burnup degree standard is satisfied can be determined using the weight of the printed layer as an index (burnup degree).

The entire disclosures of all patents, patent applications and publications, publications, and electronically available materials cited herein are incorporated by reference. In the event of any inconsistencies between the disclosure content of the present application and the disclosure content of any document incorporated herein by reference, the disclosure content of the present application has a higher priority.

The above embodiments and examples are only illustrated for clarity of understanding. No unnecessary limitation should be understood from the above embodiments and examples. The present disclosure is not limited to the exact details illustrated and described, but variations which are obvious to one skilled in the art are included within the scope defined by the claims and the doctrine of equivalents.

All item names are for the convenience of the reader and should not be used to limit the meaning of the text following the item name, unless so identified.

Various modifications can be made without departing from the spirit and scope of the present invention. These and other embodiments are intended to be included within the scope defined by the following claims and the doctrine of equivalents.

The invention claimed is:

1. A manufacturing method of a laminated sheet having a printed layer,
    given that a table that associates density data of a specific area included in image data with a burnup degree of the printed layer corresponding to the specific area at printing based on the image data is an image-burnup degree conversion table, the method comprising:
    identifying the image-burnup degree conversion table that satisfies a printing condition for a laminated sheet by a processor;
    acquiring printed image data that is image data for forming the printed layer of the laminated sheet by the processor;
    calculating the burnup degree of the printed layer based on the image-burnup degree conversion table and the printed image data by the processor;
    determining whether the laminated sheet satisfies a burnup degree standard based on the calculated burnup degree by the processor; and
    if it is determined that the burnup degree standard is satisfied, forming the printed layer in accordance with the printing condition and the printed image data by a printer in response to a command of the processor.

2. The manufacturing method according to claim 1, wherein
    the printed layer is formed on a substrate sheet,
    the printing condition includes substrate sheet information,
    the processor identifies the image-burnup degree conversion table based on the substrate sheet information,
    the processor calculates the burnup degree of the laminated sheet based on the image-burnup degree conversion table and the printed image data, and
    the processor compares the burnup degree of the laminated sheet with a reference value to determine whether the laminated sheet satisfies the burnup degree standard.

3. The manufacturing method according to claim 1, wherein
    the printed layer is formed on a substrate sheet,
    the processor calculates the burnup degree of the printed layer based on the image-burnup degree conversion table and the printed image data, and
    the processor compares the burnup degree of the printed layer with a reference value determined corresponding to the substrate sheet to determine whether the laminated sheet satisfies the burnup degree standard.

4. The manufacturing method according to claim 1, wherein
    the printed layer is formed on a substrate sheet,
    the processor calculates the burnup degree of the laminated sheet based on the image-burnup degree conversion table, the printed image data, and the burnup degree of the substrate sheet, and
    the processor compares the burnup degree of the laminated sheet with a reference value to determine whether the laminated sheet satisfies the burnup degree standard.

5. A computer program stored on a non-transitory medium causing a computer to:
    given that a table that associates density data of a specific area included in image data with a burnup degree of a printed layer corresponding to the specific area at printing based on the image data is an image-burnup degree conversion table,
    identify an image-burnup degree conversion table that satisfies a printing condition for the laminated sheet;
    acquire printed image data that is image data for forming the printed layer of the laminated sheet;
    calculate the burnup degree of the printed layer based on the image-burnup degree conversion table and the printed image data;
    determine whether the laminated sheet satisfies a burnup degree standard based on the calculated burnup degree; and
    if it is determined that the burnup degree standard is satisfied, forming the printed layer in accordance with the printing condition and the printed image data by a printer in response to a command of a processor.

* * * * *